United States Patent
Adcock et al.

(10) Patent No.: US 8,280,158 B2
(45) Date of Patent: Oct. 2, 2012

(54) SYSTEMS AND METHODS FOR INDEXING PRESENTATION VIDEOS

(75) Inventors: John Adcock, San Fracisco, CA (US); Matthew Cooper, San Francisco, CA (US); Laurent Denoue, Palo Alto, CA (US); Hamed Pirsiavash, Irvine, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 442 days.

(21) Appl. No.: 12/687,790

(22) Filed: Jan. 14, 2010

(65) Prior Publication Data

US 2011/0081075 A1    Apr. 7, 2011

Related U.S. Application Data

(60) Provisional application No. 61/248,807, filed on Oct. 5, 2009.

(51) Int. Cl.
*G06K 9/00*    (2006.01)
(52) U.S. Cl. .................... 382/165; 348/14.15; 715/723
(58) Field of Classification Search .......... 382/100, 382/103, 107, 172, 181, 190, 195, 218, 165, 382/219, 220, 221, 224–228, 305; 707/722–735; 348/14.01, 14.15; 715/723
See application file for complete search history.

(56) References Cited

U.S. PATENT DOCUMENTS

| | | | | |
|---|---|---|---|---|
| 4,864,629 A * | 9/1989 | Deering | ...... | 382/216 |
| 5,732,146 A * | 3/1998 | Yamada et al. | ...... | 382/107 |
| 6,677,961 B1 * | 1/2004 | Bhat | ...... | 715/723 |
| 6,751,354 B2 * | 6/2004 | Foote et al. | ...... | 382/224 |
| 7,466,858 B2 * | 12/2008 | Denoue et al. | ...... | 382/170 |
| 7,885,475 B2 * | 2/2011 | Yang | ...... | 382/236 |
| 2006/0147090 A1 * | 7/2006 | Yang | ...... | 382/107 |
| 2011/0317877 A1 * | 12/2011 | Bell | ...... | 382/103 |

OTHER PUBLICATIONS

Girgensohn, A., et al., "Video Classification Using Transform Coefficients," Proceedings of the Acoustics, Speech, and Signal Processing, 1999, IEEE International Conference, IEEE Computer Society, vol. 6, pp. 3045-3048.

\* cited by examiner

*Primary Examiner* — Anand Bhatnagar
(74) *Attorney, Agent, or Firm* — Morgan, Lewis & Bockius LLP

(57) ABSTRACT

A system and method for identifying key frames of a presentation video that include stationary informational content. A sequence of frames is obtained from a presentation video and differences of pixel values between consecutive frames of the sequence of frames are computed. Sets of consecutive frames that are stationary are identified, wherein consecutive frames that are stationary have a proportion of changed pixel values below a first predetermined threshold, and wherein pixel values are deemed to be changed when the difference between the pixel values for corresponding pixels in consecutive frames exceeds a second predetermined threshold. Next, a set of key frames that include stationary informational content is retained. The set of key frames that include stationary informational content is then displayed for user interaction.

33 Claims, 28 Drawing Sheets

SYSTEMS AND METHODS FOR INDEXING PRESENTATION VIDEOS

RELATED APPLICATIONS

This application is a claims priority to U.S. Provisional Patent Application No. 61/248,807, filed on Oct. 5, 2009, which is incorporated by reference in its entirety.

TECHNICAL FIELD

The disclosed embodiments relate generally systems and methods for indexing presentation videos.

BACKGROUND

As storage costs have decreased and the convenience of capturing and distributing videos in digital format has increased, videos are now widely available on the Internet. Unfortunately, it is often difficult to locate relevant videos on the Internet. One solution is to rely on users to tag videos using textual descriptions of the videos. Once the videos are tagged with textual descriptions, searches may be performed against the textual descriptions to identify videos that are relevant to the user's search terms. However, users may provide incorrect or inaccurate textual descriptions of the content of the videos. Furthermore, manually tagging videos is burdensome. Thus, it is highly desirable to provide system and method for indexing presentation videos.

SUMMARY

To address the aforementioned problems, some embodiments provide a system, a computer-readable storage medium including instructions, and a computer-implemented method for identifying key frames of a presentation video that include stationary informational content. A sequence of frames is obtained from a presentation video and differences of pixel values between consecutive frames of the sequence of frames are computed. Sets of consecutive frames that are stationary are identified, wherein consecutive frames that are stationary have a proportion of changed pixel values below a first predetermined threshold, and wherein pixel values are deemed to be changed when the difference between the pixel values for corresponding pixels in consecutive frames exceeds a second predetermined threshold. Key frames are then chosen from the sets of consecutive frames. Next, a set of key frames that include stationary informational content is retained. The set of key frames that include stationary informational content is then displayed for user interaction.

In some embodiments, only connected regions of changed pixels larger than a predetermined size are considered when determining if consecutive frames are stationary.

In some embodiments, the presentation video is an archived presentation video.

In some embodiments, the archived presentation video is located on a second computer system that is separate and distinct from the computer system.

In some embodiments, the presentation video is a real-time presentation video.

In some embodiments, the stationary informational content includes one or more of: text, symbols, line drawings, and pictures.

In some embodiments, the stationary informational content is included in one or more presentation slides.

In some embodiments, a sequence of frames is obtained from the presentation video as follows. The presentation video is retrieved and frames of the presentation video are obtained at a predetermined time interval to produce the sequence of frames.

In some embodiments, a respective set of consecutive frames (i.e., stationary consecutive frames) includes a predetermined number of consecutive frames having a proportion of changed pixel values below a first predetermined threshold, wherein pixel values are deemed to be changed when the difference between the pixel values for corresponding pixels in consecutive frames exceeds a second predetermined threshold.

In some embodiments, a respective key frame is extracted from a respective set of consecutive frames by selecting a predetermined frame from the respective set of consecutive frames.

In some embodiments, the set of key frames that include stationary informational content is retained as follows. A visual appearance model is used to identify key frames in the set of key frames that include stationary informational content. Key frames that do not include stationary informational content are removed and key frames that include stationary informational content are retained.

In some embodiments, at least one frame in the sequence of frames includes a face of a person without stationary informational content.

In some embodiments, prior to using the visual appearance model to identify key frames in the set of key frames that include stationary informational content, the visual appearance model is generated as follows. A first set of frames in the sequence of frames that do not include stationary informational content is identified. A second set of frames in the sequence of frames that include stationary informational content is identified. A support vector machine is trained to identify frames that include stationary informational content using the first set of frames and the second set of frames.

In some embodiments, the first set of frames in the sequence of frames that do not include stationary informational content is identified as follows. A third set of frames in the sequence of frames that includes consecutive frames that are not stationary is selected, wherein consecutive frames that are not stationary have differences of pixel values between consecutive frames that are above the predetermined threshold. A fourth set of frames in the third set of frames that include faces is identified using a face detection technique. A fifth set of frames in the third set of frames that do not include stationary informational content is identified using an informational content detection technique. The first set of frames is identified as frames that are included in both the fourth set of frames and the fifth set of frames.

In some embodiments, the second set of frames in the sequence of frames that include stationary informational content is identified as follows. A sixth set of frames in the sequence of frames that includes consecutive frames that are stationary is selected. A seventh set of frames in the sequence of frames that include stationary informational content is identified using an informational content detection technique. The second set of frames is identified as the frames that are included in both the sixth set of frames and the seventh set of frames.

In some embodiments, the support vector machine is trained to identify frames that include stationary informational content using the first set of frames and the second set of frames as follows. Color histograms for the first set of frames and the second set of frames are computed. The support vector machine is then trained to identify frames that include stationary informational content using the color histograms for the first set of frames and the second set of frames.

In some embodiments, the informational content detection technique is an optical character recognition technique that detects text.

In some embodiments, the visual appearance model is used to identify key frames in the set of key frames that include stationary informational content by using the support vector machine to classify key frames as either key frames that include stationary informational content or key frames that include a face of a person without stationary informational content.

In some embodiments, prior to using the visual appearance model to identify key frames in the set of key frames that include stationary informational content, the visual appearance model is generated as follows. Frames in the first set of frames that include faces using a face detection technique are identified. Color histograms for the frames in the first set of frames that include faces are determined. A template histogram is generated based on the color histograms for the frames in the first set of frames that include faces.

In some embodiments, the visual appearance model is used to identify key frames in the set of key frames that include stationary informational content by comparing the template histogram to color histograms of the key frames in the set of key frames to identify key frames in the set of key frames that include stationary informational content or key frames that include a face of a person without stationary informational content.

In some embodiments, some frames of a video may include picture-in-picture (video-in-video) regions. In these embodiments, at least one key frame in the set of key frames includes both a localized face of a person and stationary informational content. The visual appearance model is used to identify key frames in the set of key frames that include stationary informational content as follows. The visual appearance model is used to identify key frames that include a localized face of a person. An information detection technique is used to identify a subset of the key frames that include a localized face of a person that also includes stationary informational content. Key frames in the subset of the key frames that include both a localized face of a person and stationary informational content are identified.

In some embodiments, at least one key frame in the set of key frames includes both a room in which the presentation video is being filmed and stationary informational content. In these embodiments, the set of key frames that include stationary informational content is retained as follows. A room model is used to identify key frames in the set of key frames that include both the room in which the presentation video is being filmed and stationary informational content. A perspective distortion correction factor is applied to key frames that include both the room in which the presentation video is being filmed and stationary informational content. The distortion-corrected key frames are cropped so that only the stationary information content remains. The cropped distortion-corrected key frames are retained.

In some embodiments, prior to using the room model to identify key frames in the set of key frames that include both the room in which the presentation video is being filmed and stationary informational content, the room model is generated as follows. A user-selected key frame that includes both the room in which the presentation video is being filmed and stationary informational content is received. A user-identified bounding area of the user-selected key frame is received, wherein the user-identified bounding area indicates an area of the user selected key frame that includes stationary informational content. The color histogram for the area of the user-selected key frame that is outside of the user-identified bounding area is generated. A perspective distortion correction factor is calculated.

In some embodiments, the room model is used to identify key frames in the set of key frames that include both the room in which the presentation video is being filmed and stationary informational content by using the color histogram to identify key frames in the set of key frames that include both a room in which the presentation video is being filmed and stationary informational content.

In some embodiments, at least one sequence of consecutive frames comprises informational content that is built up over a number of frames. In these embodiments a respective set of consecutive frames that are stationary is identified as follows. A current frame and a prior frame in which the differences of the pixel values between the current frame and the prior frame are greater than the predetermined threshold are identified. Bounding boxes of regions of the current frame in which the differences of the pixel values between the current frame and the prior frame are greater than the predetermined threshold are identified. It is determined whether the bounding boxes are in previously blank regions of the prior frame using an edge detection technique. If the bounding boxes are in previously blank regions of the prior frame, the identifying, testing, and determining operations are repeated until the differences of the pixel values between the current frame and the prior frame exceeds the predefined threshold in regions of the prior frame that were not blank. The respective set of consecutive frames that are stationary is identified as including the sequence of consecutive frames up to and including the prior frame.

In some embodiments, links into the presentation video at time points corresponding to frames of the respective set of consecutive frames in which the bounding boxes of regions of the frames have differences of the pixel values between consecutive frames that are greater than the predetermined threshold and that have been added to previously blank regions of prior frames are provided.

In some embodiments, the at least one sequence of consecutive frames comprise informational content that is built up over a number of frames is a presentation slide that includes elements that are built up over a period of time.

In some embodiments, the at least one sequence of consecutive frames comprise informational content that is built up over a number of frames is a handwritten presentation that includes information content that is built up over a period of time.

In some embodiments, an optical character recognition technique is used to extract text from the set of key frames. The extracted text is then indexed.

In some embodiments, a search interface for user interaction is provided, wherein the search interface allows users to perform searches based on keywords to identify presentation videos including the keywords.

In some embodiments, links into the presentation video at time points corresponding to respective key frames in the displayed set of key frames are provided.

BRIEF DESCRIPTION OF THE DRAWINGS

Like reference numerals refer to corresponding parts throughout the drawings.

DESCRIPTION OF EMBODIMENTS

Some videos include stationary informational content (e.g., text, figures, etc.) that may be used to identify the content of the video. For example, one category of videos that is becoming more prevalent on the Internet is the presentation video. A presentation video may include a video of a lecture (e.g., presented at educational institutions), a presentation given at conferences, and the like. One common element of a presentation video is the use of slides (e.g., PowerPoint slides, transparencies, chalkboards, whiteboards, etc.) to organize lectures. Slides typically include stationary informational content (e.g., text, figures, etc.) that may be indexed for searching. Thus, some embodiments identify frames of a video that include stationary informational content and index the stationary informational content in the identified frames so that searches may be performed against the indexed stationary informational content. Note that although the embodiments described herein refer to presentation videos, the embodiments may be applied to any type of video content.

System Architecture

Figure 1:
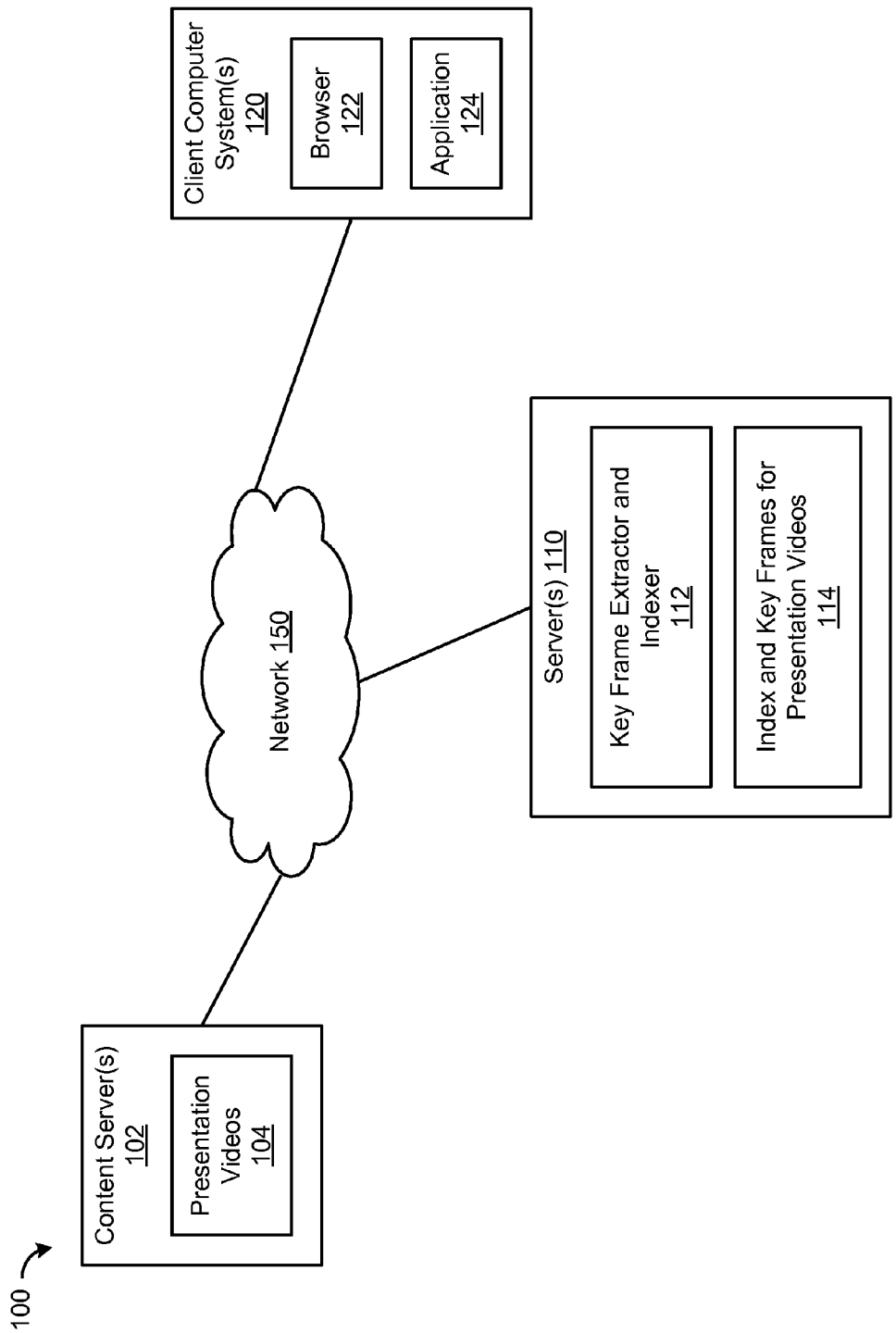
FIG. 1 is a block diagram illustrating a system for indexing presentation videos, according to some embodiments.

FIG. 1 is a block diagram illustrating a system 100 for indexing presentation videos, according to some embodiments. The system 100 includes one or more content servers 102 including presentation videos 104. Note that the content servers 102 may also include non-presentation videos. The system 100 also includes one or more servers 110 including a key frame extractor and indexer 112 that processes the presentation videos 104 to extract and index key frames for presentation videos 114. In some embodiments, the key frames for presentation videos 114 only include key frames that have stationary informational content (e.g., text, drawings, pictures, line art, etc.). The system 100 includes one or more client computer systems 120. The one more client computer systems 120 include a browser 122 (e.g., a web browser) to access content located at the one or more content servers 102 and/or the servers 110 and an application 124. In some embodiments, the application 124 is a video player for the client computer system. In some embodiments, the application 124 is a video plug-in for the browser 122. The one or more content servers 102, the one or more servers 110, and the one or more client computer systems 120 are coupled to each other via network 150. Network 150 can generally include any type of wired or wireless communication channel capable of coupling together computing nodes. This includes, but is not limited to, a local area network, a wide area network, or a combination of networks. In some embodiments, network 150 includes the Internet.

In some embodiments, the servers 110 periodically identifies the presentation videos 104 (or other videos) located on the content servers 102. In some embodiments, the servers 110 periodically check web feeds (e.g., RSS feeds, Atom feeds, etc.) for video channels to identify new presentation videos 104 (or other videos). After the presentation videos 104 have been identified, the servers 110 queue the presentation videos 104 to be retrieved from the content servers 102. When a presentation video is retrieved from a content server, the key frame extractor and indexer 112 extracts a set of time-stamped key frames and text associated with the extracted key frames (e.g., the index and key frames for the presentation videos 114), as described below. The presentation video is then available to be searched (e.g., via a search engine on the servers 110). For example, a user may submit search terms to the servers 110. In response to the search terms, the servers 110 may return a number of links to presentation videos that are relevant to the search terms. In some embodiments, when a user clicks on a link to a presentation video, the servers 110 display images of the key frames of the presentation videos that include stationary informational content. In these embodiments, the images of the key frames include a link that causes the application 124 to retrieve the presentation video from the content servers from which the presentation video is located and to start the presentation video at the time index corresponding to the key frame that was selected by the user. The user may then cause the application 124 to play the presentation video starting from the time index corresponding to the key frame that was selected by the user.

Figure 2:
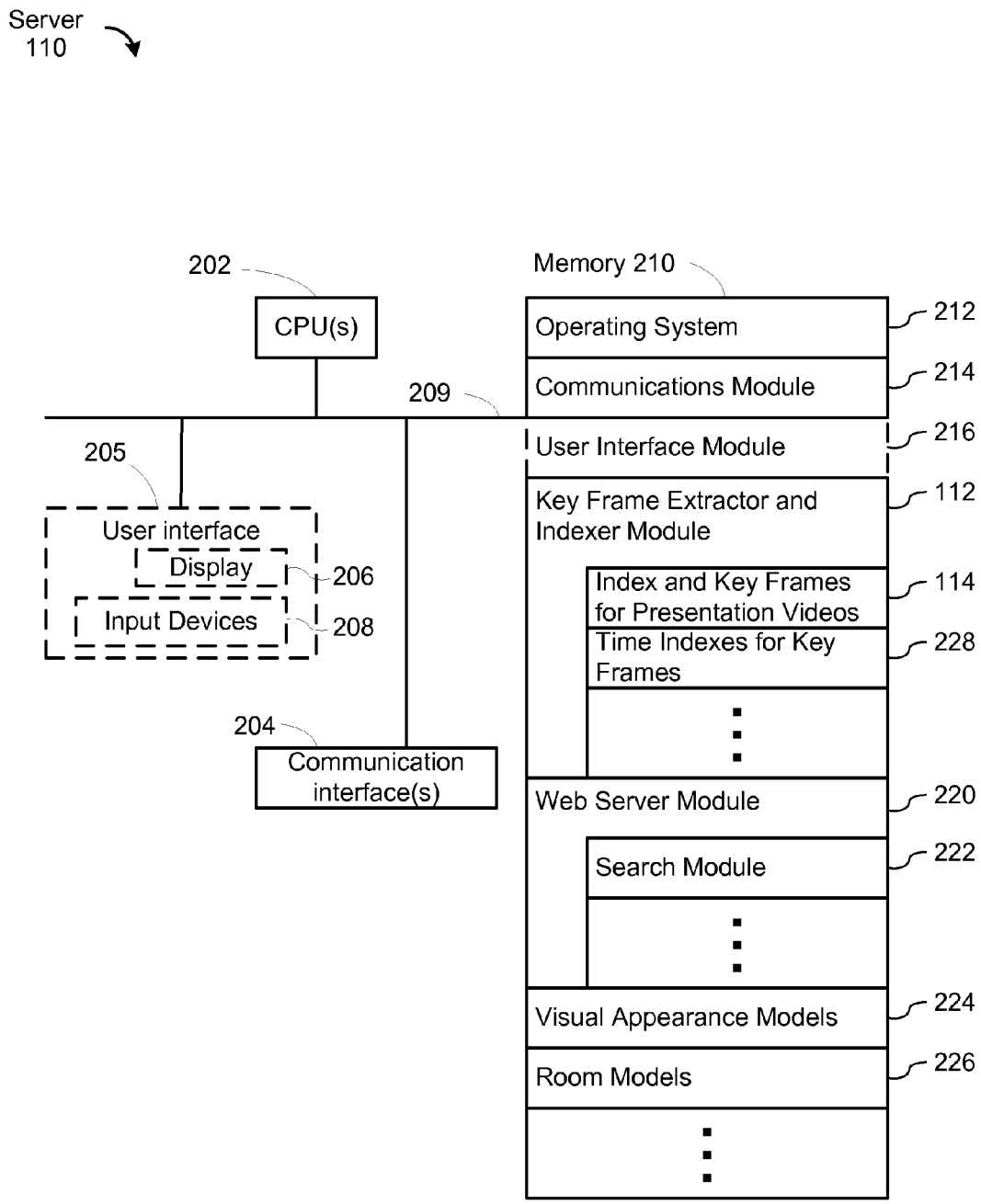
FIG. 2 is a block diagram illustrating a server for indexing presentation videos, according to some embodiments.

FIG. 2 is a block diagram illustrating the server 110, according to some embodiments. The server 110 typically includes one or more processing units (CPU's) 202, one or more network or other communications interfaces 204, memory 210, and one or more communication buses 209 for interconnecting these components. The communication buses 209 may include circuitry (sometimes called a chipset) that interconnects and controls communications between system components. The server 200 optionally may include a user interface 205 comprising a display device 206 and input devices 208 (e.g., keyboard, mouse, touch screen, keypads, etc.). Memory 210 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 210 may optionally include one or more storage devices remotely located from the CPU(s) 202. Memory 210, or alternately the non-volatile memory device(s) within memory 210, comprises a computer readable storage medium. In some embodiments, memory 210 stores the following programs, modules and data structures, or a subset thereof:

- an operating system 212 that includes procedures for handling various basic system services and for performing hardware dependent tasks;
- a communication module 214 that is used for connecting the server 110 to other computers via the one or more communication interfaces 204 (wired or wireless) and one or more communication networks, such as the Internet, other wide area networks, local area networks, metropolitan area networks, and so on;
- a optional user interface module 216 that receives commands from the user via the input devices 208 and generates user interface objects in the display device 206;
- the key frame extractor and indexer module 112 that processes presentation videos to produce index and key frames for presentation videos 114, as described herein;
- time indexes for key frames 228;
- a web server module 220 that receives and services requests for content (e.g., videos, index and key frames for presentation videos 114, web pages, etc.) from client computer systems 120, wherein the web server module 220 includes a search module 222 that searches performs keyword searches against the index and key frames for presentation videos 114, as described herein;
- one or more visual appearance models 224, as described herein; and
- one or more room models 226, as described herein.

Each of the above identified elements may be stored in one or more of the previously mentioned memory devices, and corresponds to a set of instructions for performing a function described above. The set of instructions can be executed by one or more processors (e.g., the CPUs 202). The above identified modules or programs (i.e., sets of instructions) need not be implemented as separate software programs, procedures or modules, and thus various subsets of these modules may be combined or otherwise re-arranged in various embodiments. In some embodiments, memory 210 may store a subset of the modules and data structures identified above. Furthermore, memory 210 may store additional modules and data structures not described above.

Although FIG. 2 shows a "server," FIG. 2 is intended more as functional description of the various features which may be present in a set of servers than as a structural schematic of the embodiments described herein. In practice, and as recognized by those of ordinary skill in the art, items shown separately could be combined and some items could be separated. For example, some items shown separately in FIG. 2 could be implemented on single servers and single items could be implemented by one or more servers. The actual number of servers used to implement the server and how features are allocated among them will vary from one implementation to another, and may depend in part on the amount of data traffic that the system must handle during peak usage periods as well as during average usage periods.

Figure 3:
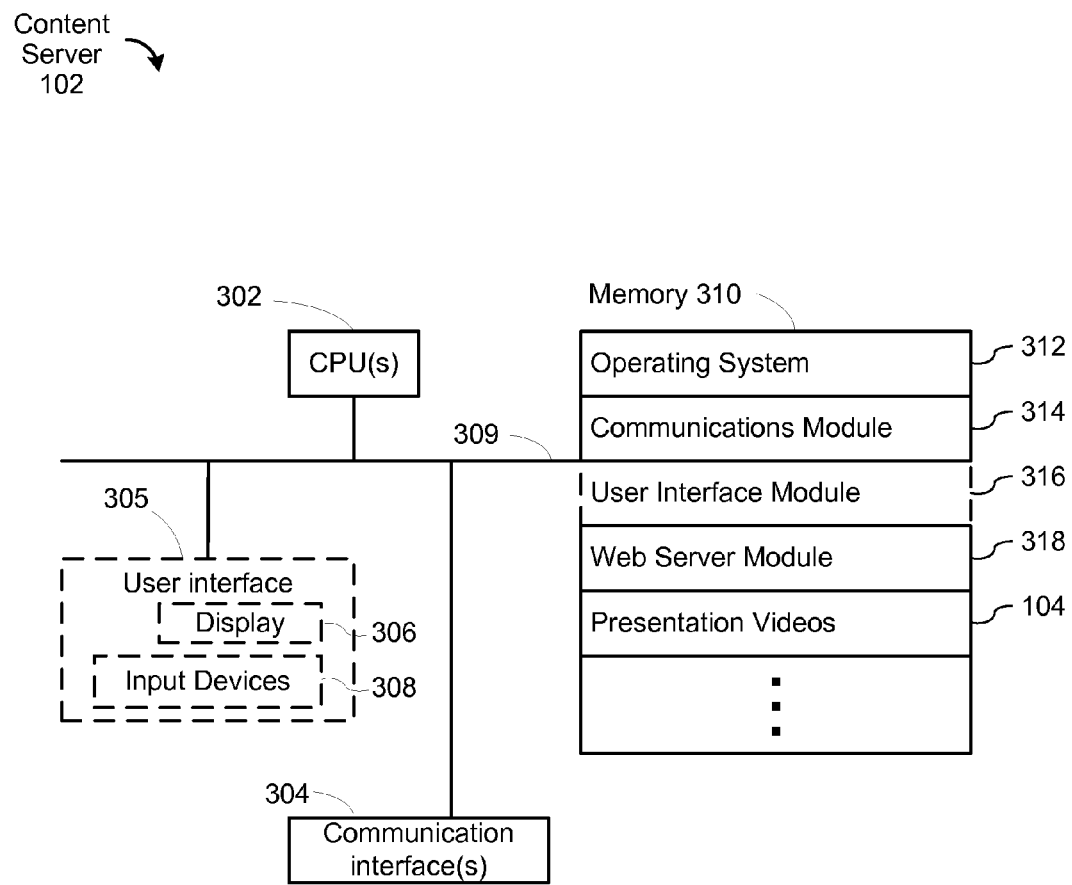
FIG. 3 is a block diagram illustrating a content server, according to some embodiments.

FIG. 3 is a block diagram illustrating the content server 102, according to some embodiments. The content server 102 typically includes one or more processing units (CPU's) 302, one or more network or other communications interfaces 304, memory 310, and one or more communication buses 309 for interconnecting these components. The communication buses 309 may include circuitry (sometimes called a chipset) that interconnects and controls communications between system components. The content server 102 optionally may include a user interface 305 comprising a display device 306 and input devices 308 (e.g., keyboard, mouse, touch screen, keypads, etc.). Memory 310 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 310 may optionally include one or more storage devices remotely located from the CPU(s) 302. Memory 310, or alternately the non-volatile memory device(s) within memory 310, comprises a computer readable storage medium. In some embodiments, memory 310 stores the following programs, modules and data structures, or a subset thereof:

- an operating system 312 that includes procedures for handling various basic system services and for performing hardware dependent tasks;
- a communication module 314 that is used for connecting the content server 102 to other computers via the one or more communication interfaces 304 (wired or wireless) and one or more communication networks, such as the Internet, other wide area networks, local area networks, metropolitan area networks, and so on;
- a optional user interface module 316 that receives commands from the user via the input devices 308 and generates user interface objects in the display device 306;
- a web server module 318 that receives and services requests for content (e.g., videos, web pages, etc.) from client computer systems 120; and
- the presentation videos 104.

Each of the above identified elements may be stored in one or more of the previously mentioned memory devices, and corresponds to a set of instructions for performing a function described above. The set of instructions can be executed by one or more processors (e.g., the CPUs 302). The above identified modules or programs (i.e., sets of instructions) need not be implemented as separate software programs, procedures or modules, and thus various subsets of these modules may be combined or otherwise re-arranged in various embodiments. In some embodiments, memory 310 may store a subset of the modules and data structures identified above. Furthermore, memory 310 may store additional modules and data structures not described above.

Although FIG. 3 shows a "content server," FIG. 3 is intended more as functional description of the various features which may be present in a set of content servers than as a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers. The actual number of servers used to implement the content server and how features are allocated among them will vary from one implementation to another, and may depend in part on the amount of data traffic that the system must handle during peak usage periods as well as during average usage periods.

Figure 4:
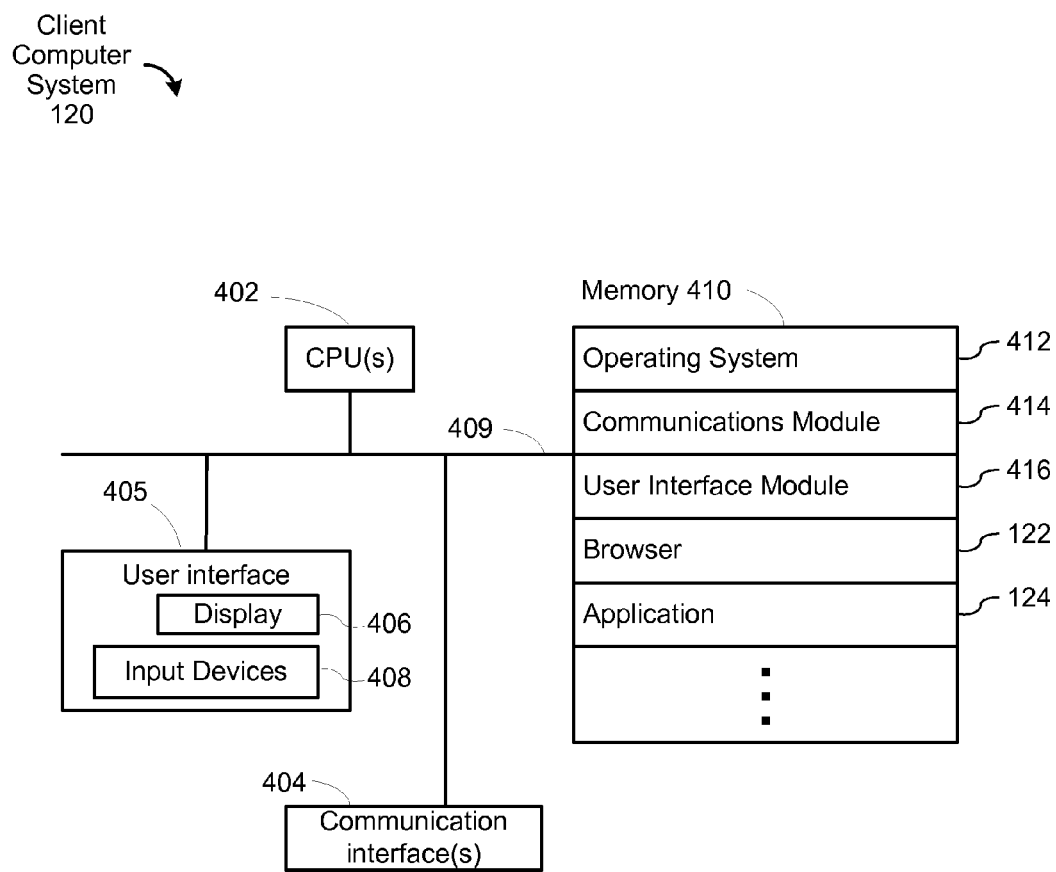
FIG. 4 is a block diagram illustrating a client computer system, according to some embodiments.

FIG. 4 is a block diagram illustrating the client computer system 120, according to some embodiments. The client computer system 120 typically includes one or more processing units (CPU's) 402, one or more network or other communications interfaces 404, memory 410, and one or more communication buses 409 for interconnecting these components. The communication buses 409 may include circuitry (sometimes called a chipset) that interconnects and controls communications between system components. The client computer system 120 also includes a user interface 405 comprising a display device 406 and input devices 408 (e.g., keyboard, mouse, touch screen, keypads, etc.). Memory 410 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 410 may optionally include one or more storage devices remotely located from the CPU(s) 402. Memory 410, or alternately the non-volatile memory device(s) within memory 410, comprises a computer readable storage medium. In some embodiments, memory 410 stores the following programs, modules and data structures, or a subset thereof:

- an operating system 412 that includes procedures for handling various basic system services and for performing hardware dependent tasks;
- a communication module 414 that is used for connecting the client computer system 120 to other computers via the one or more communication interfaces 404 (wired or wireless) and one or more communication networks, such as the Internet, other wide area networks, local area networks, metropolitan area networks, and so on;
- a user interface module 416 that receives commands from the user via the input devices 408 and generates user interface objects in the display device 406;
- the browser 122 (e.g., a web browser) that provides a user interface for accessing content over a network; and
- the application 124 that plays videos, wherein the application 124 is either a standalone video player or a plug-in for the browser 122.

Each of the above identified elements may be stored in one or more of the previously mentioned memory devices, and corresponds to a set of instructions for performing a function described above. The set of instructions can be executed by one or more processors (e.g., the CPUs 402). The above identified modules or programs (i.e., sets of instructions) need not be implemented as separate software programs, procedures or modules, and thus various subsets of these modules may be combined or otherwise re-arranged in various embodiments. In some embodiments, memory 410 may store a subset of the modules and data structures identified above. Furthermore, memory 410 may store additional modules and data structures not described above.

Although FIG. 4 shows a "client computer system," FIG. 4 is intended more as functional description of the various features which may be present in a set of content servers than as a structural schematic of the embodiments described herein. In practice, and as recognized by those of ordinary skill in the art, items shown separately could be combined and some items could be separated.

Frame Types

Before continuing the discussion, it is instructive to discuss the types of frames of a presentation video that are typically encountered.

Figure 5A:
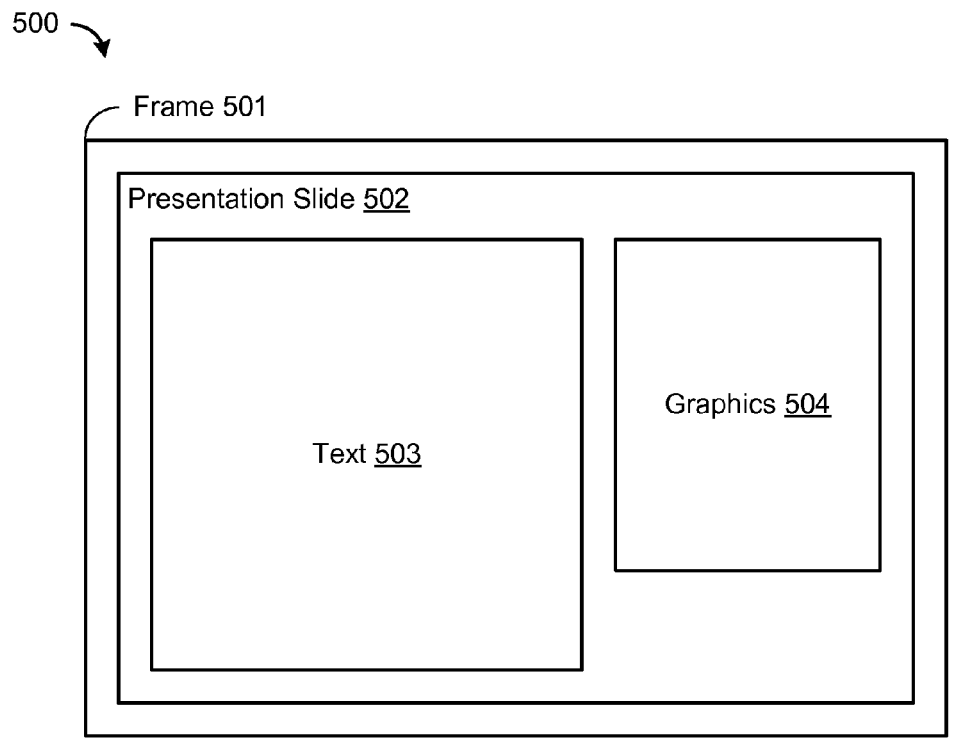
FIG. 5A is a block diagram illustrating a frame of a presentation video including a presentation slide, according to some embodiments.

FIG. 5A is a block diagram 500 illustrating a frame 501 of a presentation video that includes a presentation slide 502 having text 503 and graphics 504 (e.g., symbols, line drawings, figures, pictures, etc.), according to some embodiments. In the frame 501, the presentation slide 502 is displayed in full without any other content (e.g., a presenter, faces, people at the presentation, a room in which the presentation is being given, etc.). In the frame 501, the text 503 and the graphics 504 are referred to as "stationary informational content."

In some embodiments, stationary informational content includes one or more of text, symbols, line drawings, figures, pictures, and the like. In some embodiments, stationary informational content excludes a presenter of the presentation, faces of the presenter and/or the people attending the presentation, a room in which the presentation is being given, and any other object that does not convey information that may be indicative of the content of the presentation being delivered in the presentation video.

In some embodiments, the presentation slide 504 is presented on a blackboard (e.g., chalk on a blackboard), a whiteboard (e.g., colored ink on a whiteboard), a screen (e.g., a transparency slide projected from an overhead projector or camera to a screen, a digital slide projected from a digital projector to a screen, etc.).

Figure 5B:
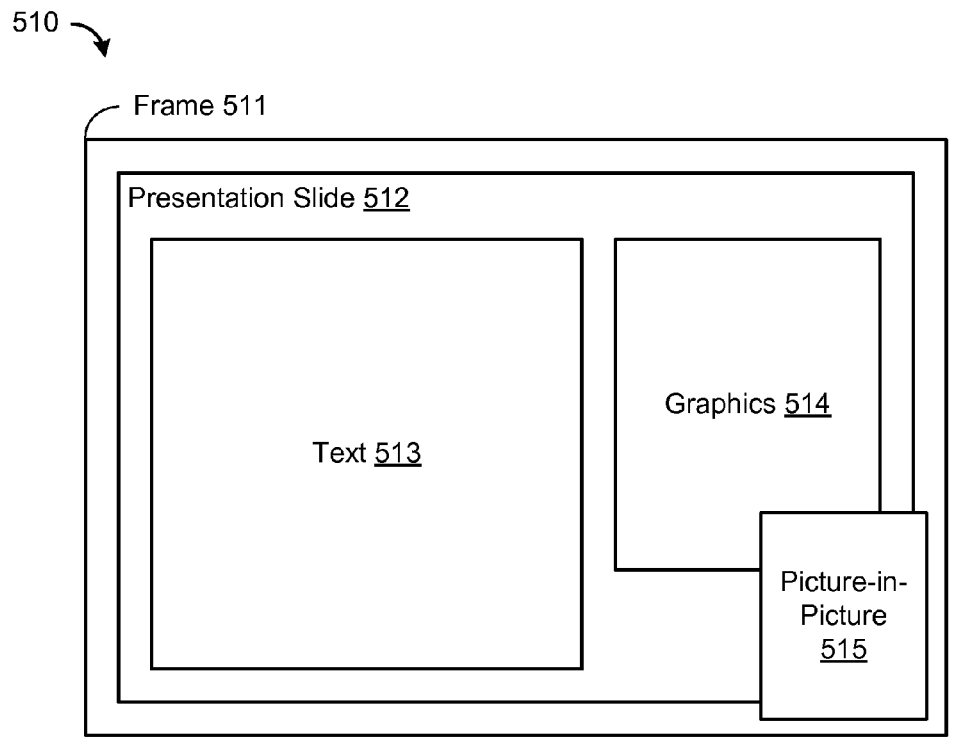
FIG. 5B is a block diagram illustrating a frame of a presentation video including a presentation slide and a picture-in-picture region, according to some embodiments.

FIG. 5B is a block diagram 510 illustrating a frame 511 of a presentation video that includes a presentation slide 512 having text 513 and graphics 514, and a picture-in-picture (or video-in-video) region 515, according to some embodiments. The presentation slide 512 (i.e., stationary informational content) is displayed in full in the frame 511. However, the picture-in-picture region 515 is overlaid on top of the presentation slide 512. Typically, the picture-in-picture region 515 includes a live video feed of a face of the presenter as the presenter is speaking.

Figure 5C:
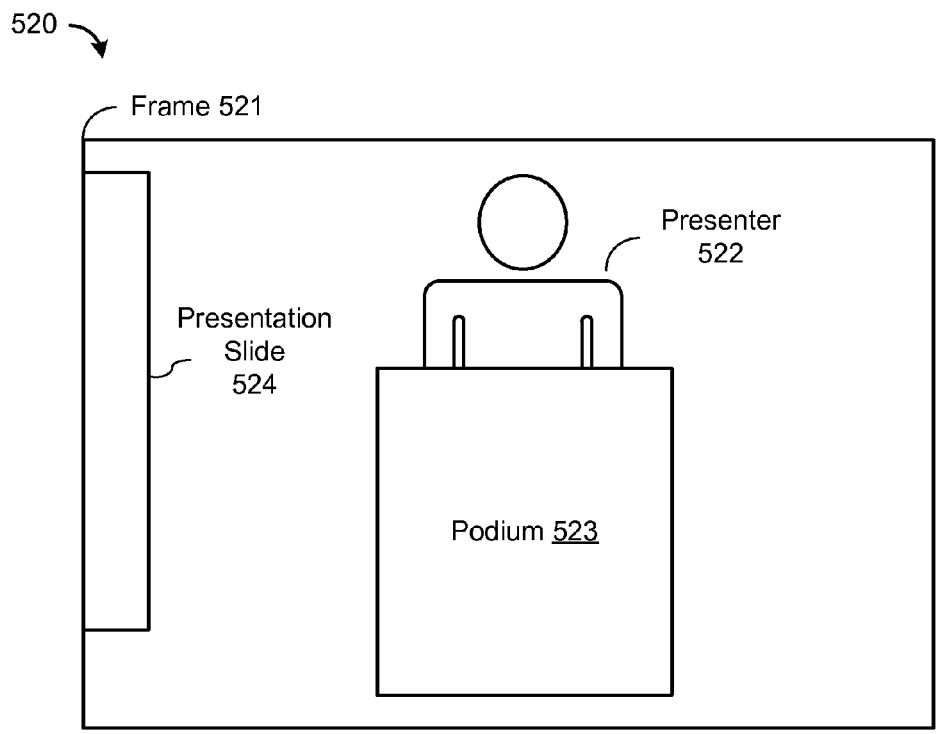
FIG. 5C is a block diagram illustrating a frame of a presentation video including a presentation slide and a presenter, according to some embodiments.

FIG. 5C is a block diagram 520 illustrating a frame 521 of a presentation video that includes a portion of a presentation slide 524 and a presenter 522 behind a podium 523, according to some embodiments. As illustrated in FIG. 5C, the main focus of the frame 521 is the presenter 522, who is displayed in full in the frame 521. The frame 521 includes little or no stationary informational content.

Figure 5D:
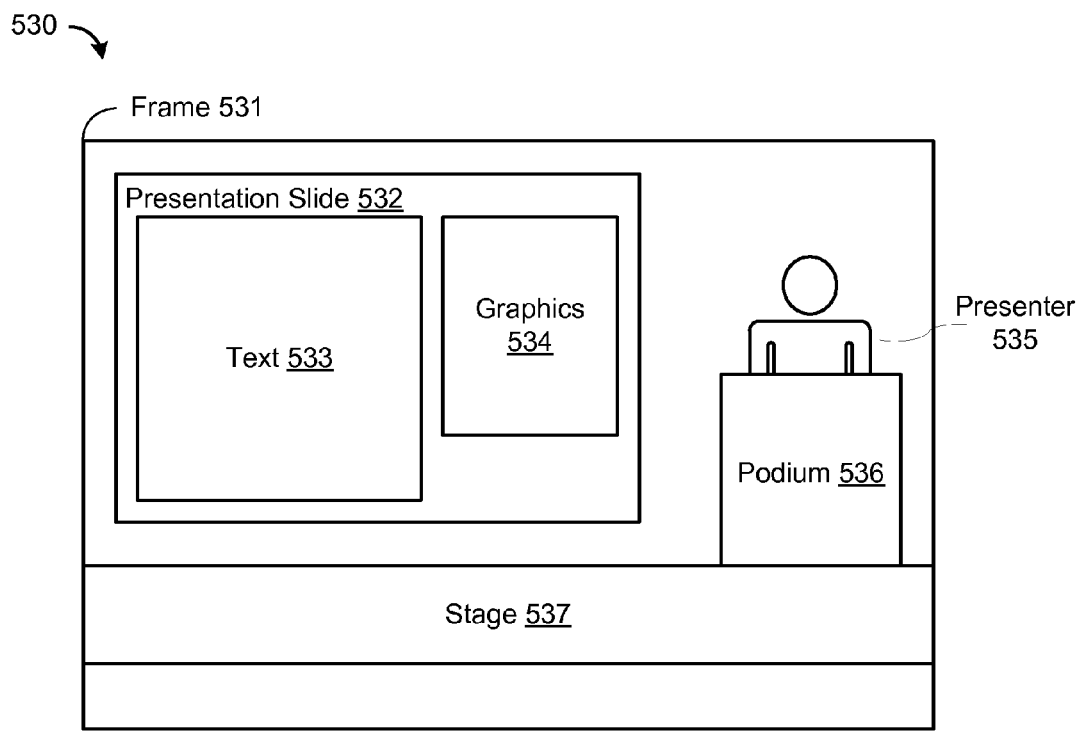
FIG. 5D is a block diagram illustrating a frame of a presentation video including a presentation slide and a presenter on a stage, according to some embodiments.

FIG. 5D is a block diagram 530 illustrating a frame 531 of a presentation video that includes a presentation slide 532 having text 533 and graphics 534 and a presenter 535 on a stage 537, according to some embodiments. As illustrated in FIG. 5C, both the presentation slide 532 (i.e., stationary informational content) and the presenter 535 are displayed in full in the frame 531. Furthermore, at least a portion of the room in which the presentation is being given is in the frame 531 (e.g., the stage 537). The frame 531 is typically referred to as a "back-of-the-room" frame in which the presentation slide 532, the presenter 535, and at least a portion of the room in which the presentation is given are all included in the frame.

Key Frame Extraction

Key frames that include stationary informational content (e.g., presentation slides that include text, figures, symbols, etc.) are good candidates to be indexed and to be presented to users for several reasons. First, stationary informational content provides context for the presentation video content by giving the user an idea of the content of the presentation video without requiring the user to preview the audio or video streams of the presentation video. Second, stationary informational content contains text that can often be extracted by an informational content detection technique, such as an optical character recognition (OCR) technique, and that can be used to generate an index for text-based search into the presentation video. Finally, stationary informational content is typically used by presenters to organize their presentations, and thus, often delimit topically coherent portions of the presentations. Thus, some embodiments identify stationary informational content in frames of the presentation videos and extract key frames for indexing and user navigation.

Figure 6:
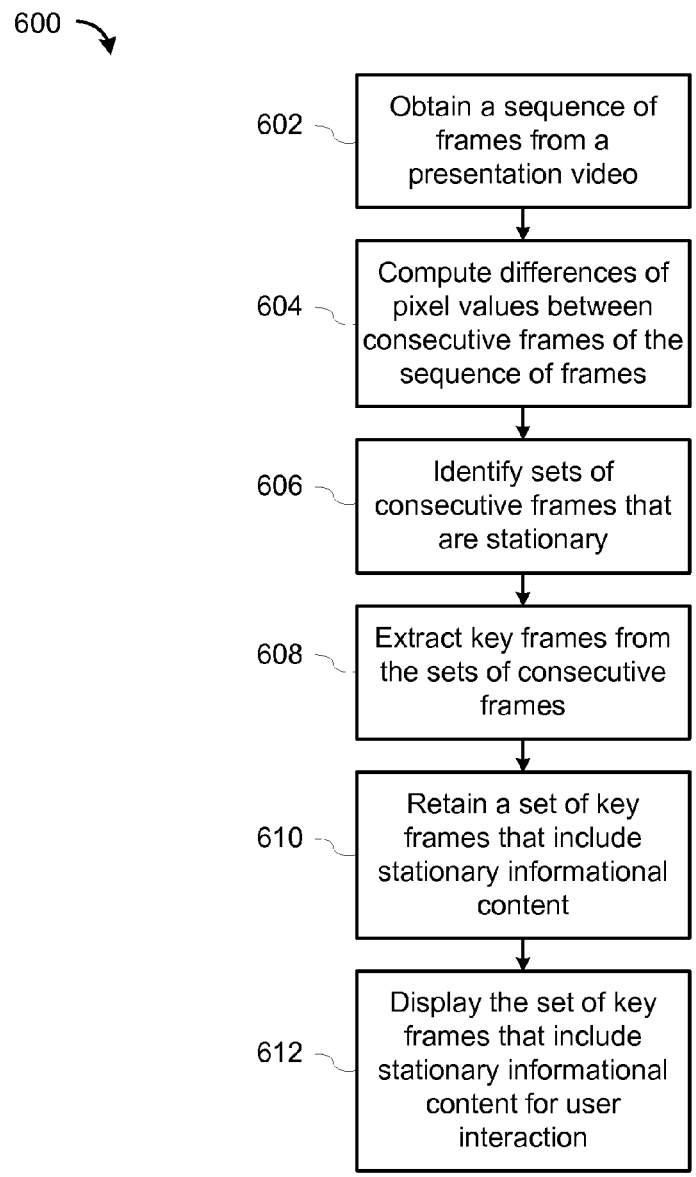
FIG. 6 is a flowchart of a method for identifying key frames of a presentation video that include stationary informational content, according to some embodiments.

FIG. 6 is a flowchart of a method 600 for identifying key frames of a presentation video that include stationary informational content, according to some embodiments. In some embodiments, the stationary informational content is included in one or more presentation slides. In some embodiments, the presentation video is an archived presentation video. In some embodiments, the archived presentation video is located on a second computer system (e.g., the content server 102) that is separate and distinct from the server 110. In some embodiments, the archived presentation video is located on the server 110. In these embodiments, the archived presentation videos may have been originally uploaded to the server 110 by a user. Alternatively, or additionally, the presentation videos may be downloaded from the content servers 102 to the server 110. In some embodiments, the presentation video is a real-time presentation video. In these embodiments, the presentation video may be streamed to the server 110.

Figure 18:
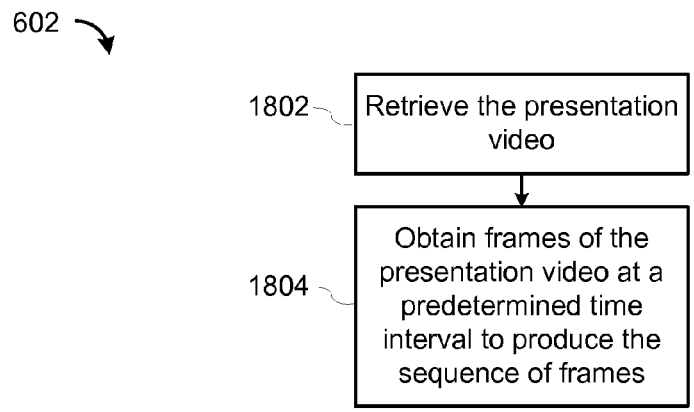
FIG. 18 is a flowchart of a method for obtaining a sequence of frames from a presentation video, according to some embodiments.

The server 110 obtains (602) a sequence of frames from a presentation video. Attention is now directed to FIG. 18, which is a flowchart of a method for obtaining (602) the sequence of frames from the presentation video, according to some embodiments. The server 110 retrieves (1802) the presentation video and obtains (1804) frames of the presentation video at a predetermined time interval to produce the sequence of frames. For example, the server 110 may obtain frames from the presentation video at one frame per second to produce the sequence of frames.

Returning to FIG. 1, the server 110 then computes (604) differences of pixel values between consecutive frames of the sequence of frames and identifies (606) sets of consecutive frames that are stationary, wherein consecutive frames that are stationary have a proportion of changed pixel values below a first predetermined threshold, and wherein pixel values are deemed to be changed when the difference between the pixel values for corresponding pixels in consecutive frames exceeds a second predetermined threshold. In some embodiments, only connected regions of changed pixels larger than a predetermined size are considered when computing the proportion of changed pixels. Note that connected regions are identified by forming sets of pixels, where each set of pixels includes pixels that have a continuous path to other pixels in the set of pixels through successive adjacent pixels in the set of pixels. In some embodiments, a respective set of consecutive frames includes a predetermined number of consecutive frames having a proportion of changed pixel values below a first predetermined threshold, wherein pixel values are deemed to be changed when the difference between the pixel values for corresponding pixels in consecutive frames exceeds a second predetermined threshold. In other words, the respective set of consecutive frames is stationary for a predetermined time interval. For example, if the predetermined number of consecutive frames is three and the sequence of frames is extracted at one frame per second, the respective set of consecutive frames is stationary for three seconds. Identifying consecutive frames that are stationary increases the likelihood that these frames include stationary informational content. Specifically, stationary informational content such as slides tend to be stationary between consecutive frames. In other words, the stationary informational content does not change from frame to frame. Note that the predetermined threshold is selected so that noise in the presentation video does not cause frames including stationary informational content to be misclassified as non-stationary frames. Also note that frames that include a full frame image of the presenter, the audience, and/or the room in which the presentation is being given may be incorrectly identified as stationary depending on the resolution of the presentation video and/or the amount that the presenter and/or the audience moves between consecutive frames. A solution to this problem is discussed below with respect to FIGS. 8-23 below.

The server 110 then extracts (608) key frames from the sets of consecutive frames. In some embodiments, the server 110 extract a respective key frame from a respective set of consecutive frames by selecting a predetermined frame from the respective set of consecutive frames. Since each frame in a respective set of consecutive frames includes the same informational content (e.g., text, figures, etc.), only one frame from the respective set of frames is needed. For example, if the respective set of consecutive frames includes three frames, the server 110 may select the last frame in the respect set of consecutive frames. In some embodiments, the server 110 extracts the timestamp (or time index) (e.g., time indexes for key frames 228) corresponding of the extracted key frame.

Next, the server 110 retains (610) a set of key frames that include stationary informational content. This operation is described in more detail below with respect to FIGS. 7-23 below. The server 110 then displays (612) the set of key frames that include stationary informational content for user interaction. In some embodiments, the server 110 links each displayed key frame to its corresponding timestamp (or time index) in the presentation videos so that when a user clicks on the displayed key frame, the application 124 retrieves and starts the presentation video at the timestamp (or time index) corresponding to the clicked key frame.

Figure 17:
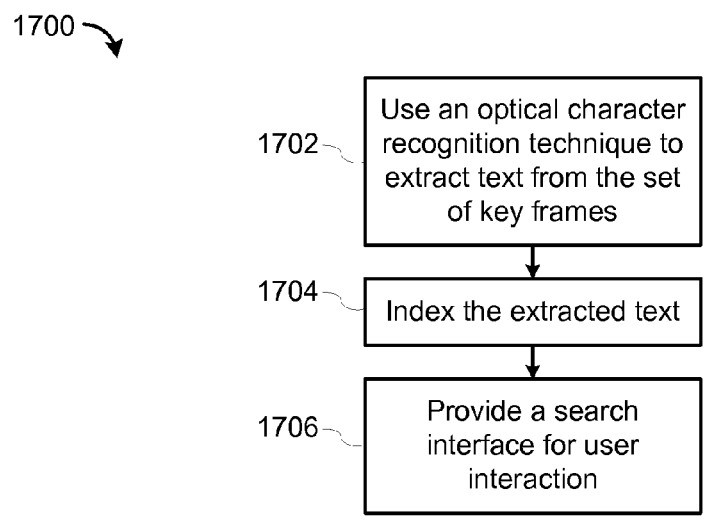
FIG. 17 is a flowchart of a method for extracting and indexing text in key frames, according to some embodiments.

In some embodiments, the server 110 indexes the key frames and provides a search interface for user interaction. FIG. 17 is a flowchart of a method 1700 for extracting and indexing text in key frames, according to some embodiments. The server 110 uses (1702) an optical character recognition technique to extract text from the set of key frames. Next, the server 110 indexes (1704) the extracted text. The server 110 then provides (1706) a search interface for user interaction, wherein the search interface allows users to perform searches based on keywords to identify presentation videos including the keywords. In some embodiments, the search results returned to users include thumbnails of extracted stationary content that contains the keywords entered by users. In some embodiments, the keywords can be highlighted (e.g., shown in a different color, typeface or font) where they appear on the thumbnails of the extracted content.

The process described with respect to FIG. 6 is able to identify the majority of the stationary informational content in a presentation video. However, there are several special cases that need to be addressed. Frames that include the presenter and that include little or no stationary informational content (e.g., FIG. 5C) may be misclassified as including stationary informational content, as described above. Frames that include a picture-in-picture (or video-in-video) region and frames that include stationary informational content, the presenter, and/or the audience may be missed if the movements of the presenter and/or the audience cause the differences of pixel values to exceed the predetermined threshold.

Visual Appearance Model

In some embodiments, at least one frame in the sequence of frames includes a face of a person without stationary informational content. To address the cases in which the presenter appears in all or part of a frame of the presentation video, in some embodiments, the server 110 generates a visual appearance model (e.g., the visual appearance model 224) for the presentation video that captures visual characteristics of the presenter and the background. The visual appearance model is generated from the sequence of frames that are obtained from the presentation video (e.g., from step 602 in FIG. 6). In some embodiments, the visual appearance model is a discriminative visual appearance model. In some embodiments, the visual appearance model is a generative visual appearance model. The generative visual appearance model estimates how likely it is for the model to generate the frame being tested (e.g., how likely it is to generate a frame with a given color histogram). The discriminative appearance model uses both negative and positive examples to train a classifier that classifies each frame into one of two classes (e.g., discriminating between two classes).

Figure 19:
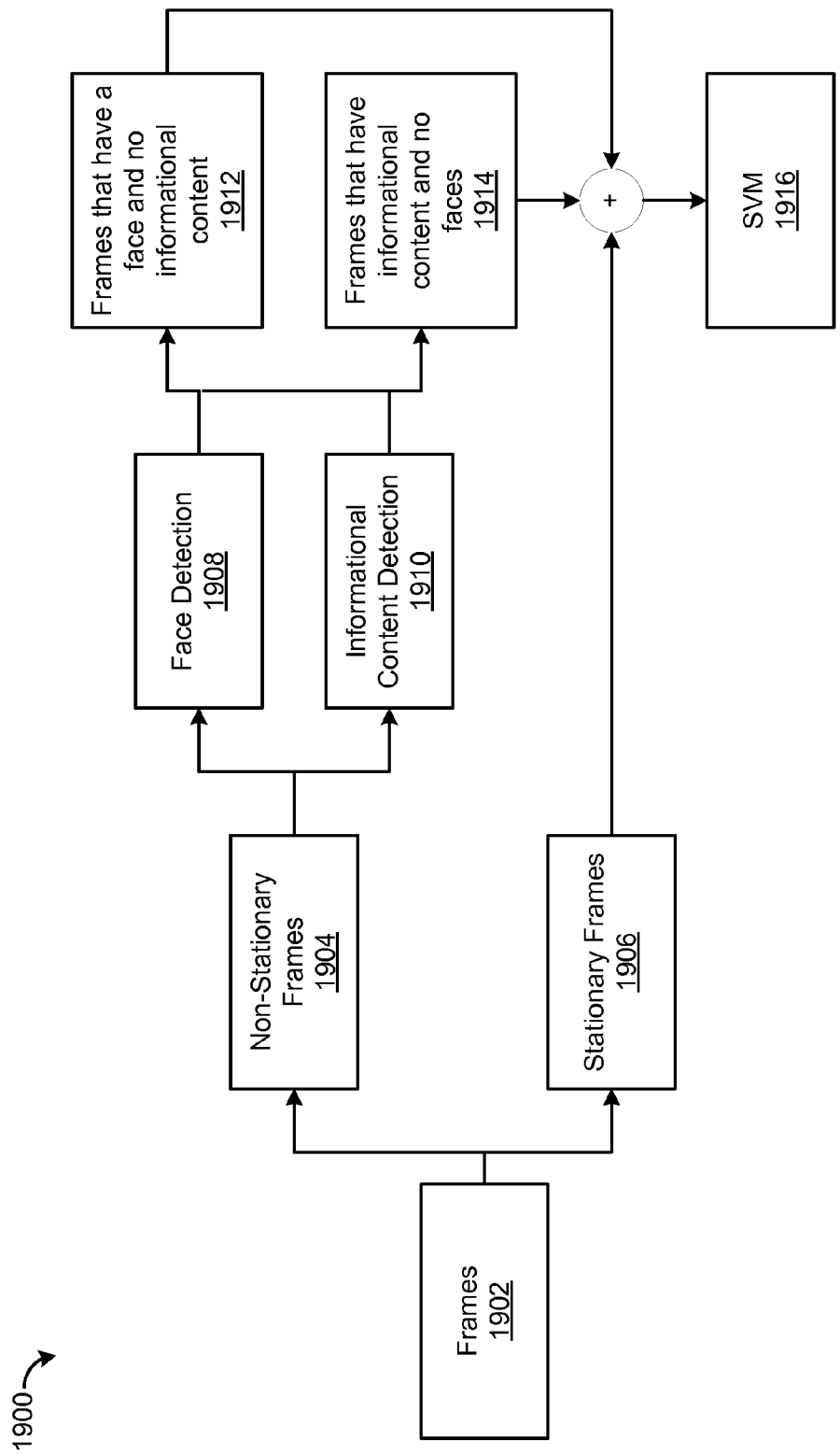
FIG. 19 is a block diagram of a process for training a support vector machine that identifies frames including stationary informational content, according to some embodiments.

In some embodiments, in the discriminative visual appearance model, both a face detection technique and an informational content detection technique are used to group the sampled frames. This process is illustrated in FIG. 19, which is a block diagram 1900 of a process for training a support vector machine that identifies frames including stationary informational content, according to some embodiments. As illustrated in FIG. 19, frames 1902 are first grouped into stationary frames 1906 and non-stationary frames 1904, as discussed above. A face detection technique 1908 and an informational content detection technique 1910 (e.g., OCR) are applied to the non-stationary frames 1904 to group the non-stationary frames 1904 into frames that have a face and no informational content 1912 and frames that have informational content and no faces 1914. The stationary frames 1906, the frames that have a face and no informational content 1912, and the frames that have informational content and no faces 1914 are then used to train the support vector machine (SVM) 1916. Note that any supervised multi-class (or at least two-class) classifiers (e.g., a neural network, a Gaussian mixture model, boosting classifiers, nearest neighbor classifiers, decision tree classifiers, etc.) may be used in lieu of the SVM.

Figure 8:
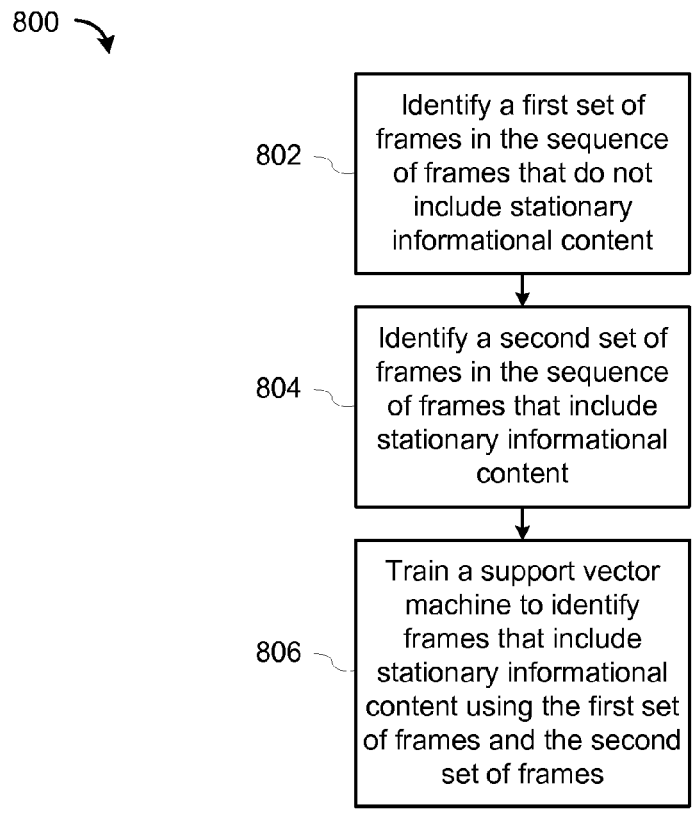
FIG. 8 is a flowchart of a method for generating a visual appearance model, according to some embodiments.
Figure 9:
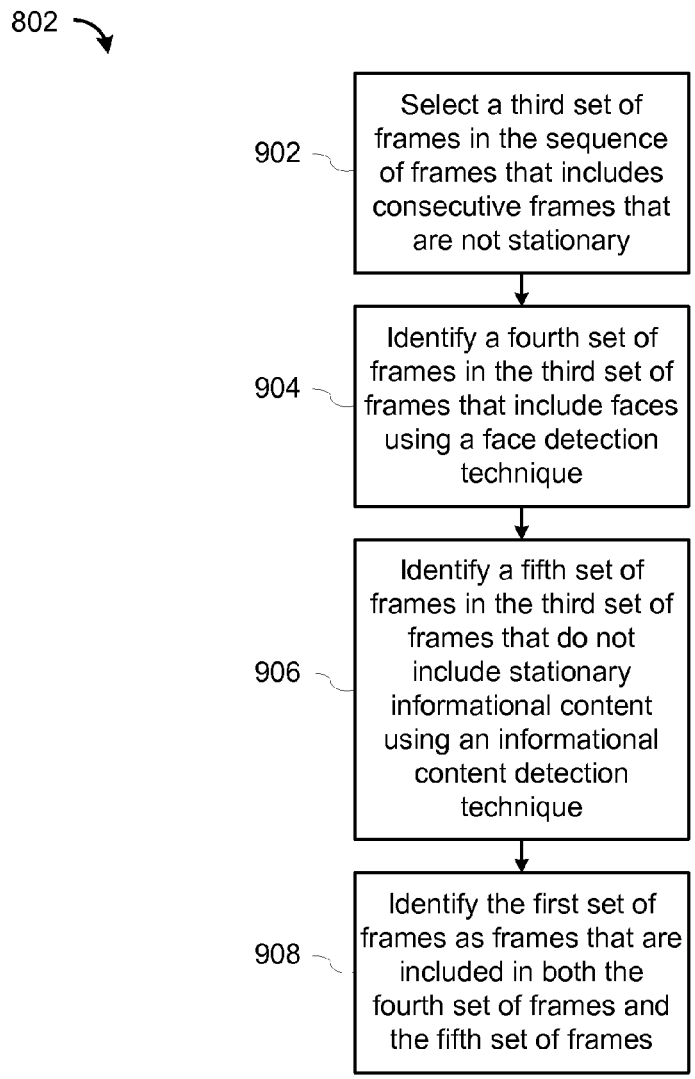
FIG. 9 is a flowchart of a method for identifying frames in the sequence of frames that do not include stationary informational content, according to some embodiments.

FIG. 8 is a flowchart of a method 800 for generating a discriminative visual appearance model for a presentation video, according to some embodiments. The server 110 identifies (802) a first set of frames in the sequence of frames that do not include stationary informational content. Attention is now directed to FIG. 9, which is a flowchart of a method for identifying (802) the first set of frames in the sequence of frames that do not include stationary informational content, according to some embodiments. The server 110 selects (902) a third set of frames in the sequence of frames that includes consecutive frames that are not stationary, wherein consecutive frames that are not stationary have differences of pixel values between consecutive frames that are above the predetermined threshold. In some embodiments, the third set of frames may be randomly selected from the sequence of frames that are not stationary. Next, the server 110 identifies (904) a fourth set of frames in the third set of frames that include faces using a face detection technique. The server 110 then identifies (906) a fifth set of frames in the third set of frames that do not include stationary informational content using an informational content detection technique. In some embodiments, the informational content detection technique is an optical character recognition technique that detects text. Next, the server 110 identifies (908) the first set of frames as frames that are included in both the fourth set of frames and the fifth set of frames.

Figure 10:
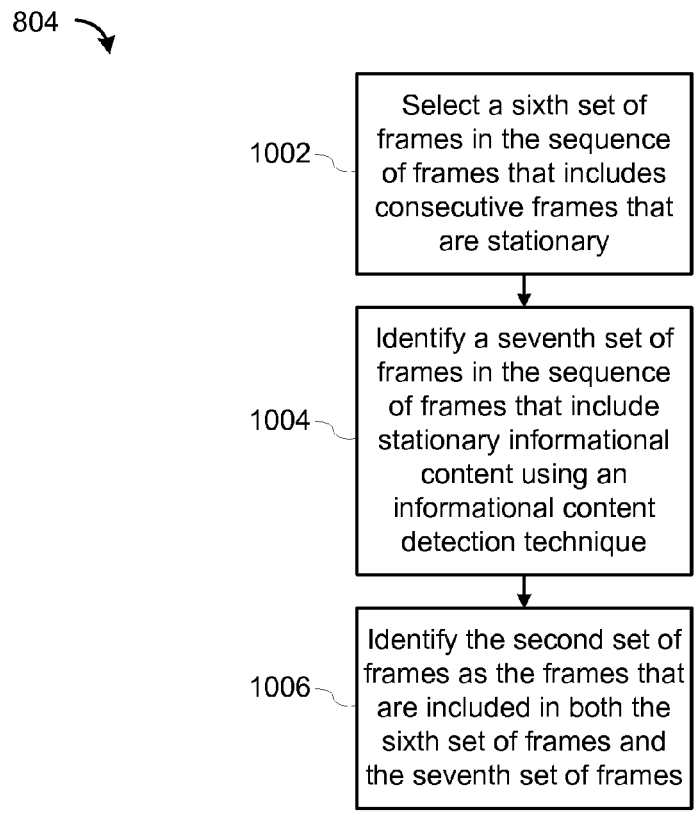
FIG. 10 is a flowchart of a method for identifying frames that include stationary informational content, according to some embodiments.

Returning to FIG. 8, the server 110 then identifies (804) a second set of frames in the sequence of frames that include stationary informational content. Attention is now directed to FIG. 10, which is a flowchart of a method for identifying (804) the second set of frames in the sequence of frames that include stationary informational content, according to some embodiments. The server 110 selects (1002) a sixth set of frames in the sequence of frames that includes consecutive frames that are stationary. Next, the server 110 identifies (1004) a seventh set of frames in the sequence of frames that include stationary informational content using an informational content detection technique. In some embodiments, the informational content detection technique is an optical character recognition technique that detects text. The server 110 then identifies (1006) the second set of frames as the frames that are included in both the sixth set of frames and the seventh set of frames.

In some embodiments, the server 110 identifies an eighth set of frames that includes a representative frame from sets of consecutive stationary key frames having more than a predetermined number of consecutive stationary frames. In these embodiments, the server 110 identifies (1006) the second set of frames as the frames that are included in both the sixth and seventh set of frames, or in the eighth set of frames.

Figure 11:
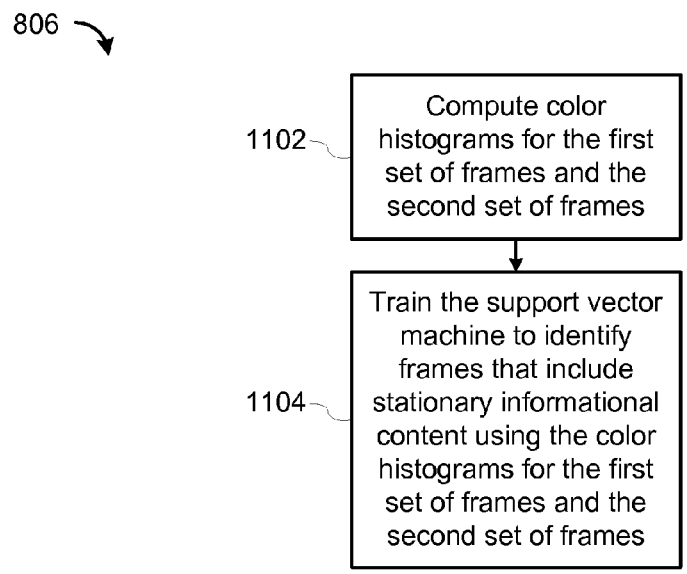
FIG. 11 is a flowchart of a method for training a support vector machine to identify frames that include stationary informational content, according to some embodiments.

Returning to FIG. 8, the server 110 then trains (806) a support vector machine to identify frames that include stationary informational content using the first set of frames and the second set of frames. Attention is now directed to FIG. 11, which is a flowchart of a method for training (806) the support vector machine to identify frames that include stationary informational content using the first set of frames and the second set of frames, according to some embodiments. The server 110 computes (1102) color histograms for the first set of frames and the second set of frames. The server 110 then trains (1104) the support vector machine (SVM) to identify frames that include stationary informational content using the color histograms for the first set of frames and the second set of frames. Note that the SVM uses knowledge of whether a respective frame includes a face and no informational content (i.e., the first set of frames described with reference to FIG. 19) or the respective frame includes informational content and no faces during the training process.

Figure 12:
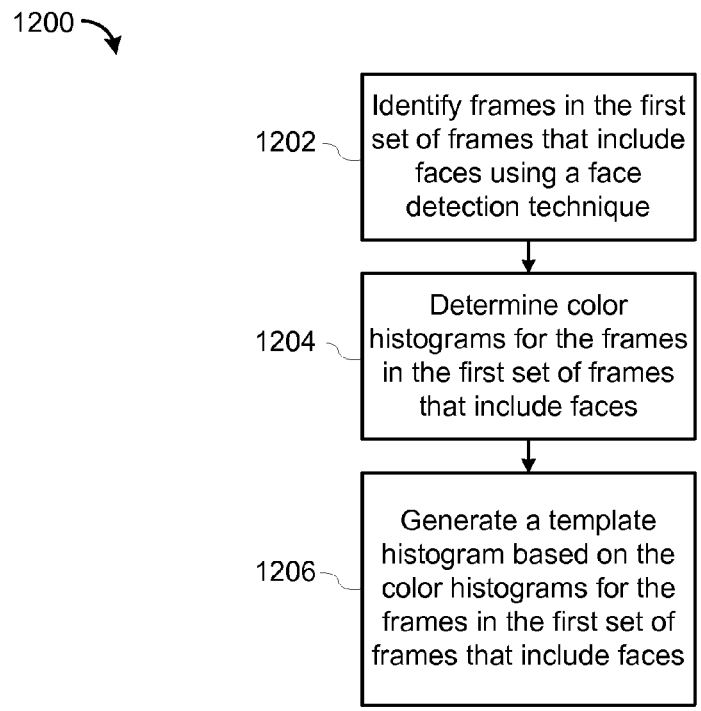
FIG. 12 is a flowchart of another method for generating a visual appearance model, according to some embodiments.

FIG. 12 is a flowchart of a method 1200 for generating a generative visual appearance model, according to some embodiments. The server 110 identifies (1202) frames in the first set of frames that include faces using a face detection technique. The server 110 then determines (1204) color histograms for the frames in the first set of frames that include faces and generates (1206) a template histogram based on the color histograms for the frames in the first set of frames that include faces.

Figure 7:
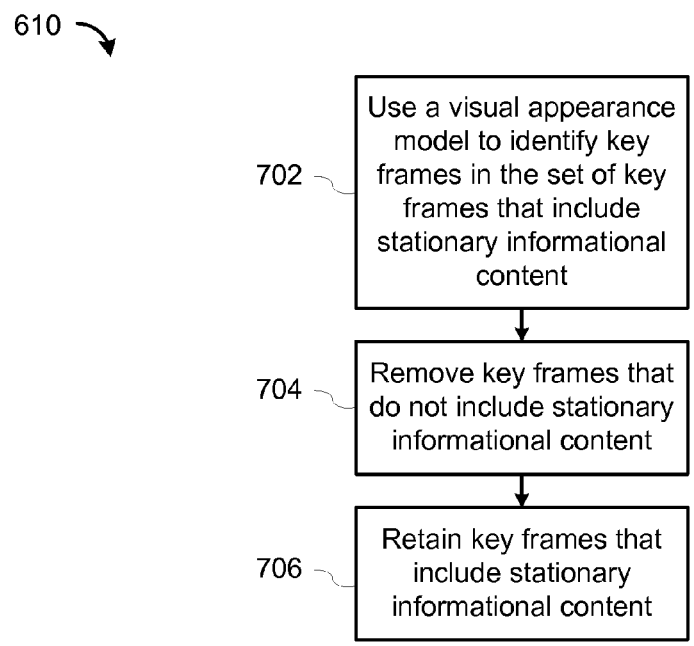
FIG. 7 is a flowchart of a method for retaining key frames that include stationary informational content, according to some embodiments.

After the visual appearance model is generated, the visual appearance model is used to determine which key frames to retain. Attention is now directed to FIG. 7, which is a flowchart of a method for retaining (610) the set of key frames that include stationary informational content, according to some embodiments. The server 110 uses (702) the visual appearance model to identify key frames in the set of key frames that include stationary informational content.

Figure 20:
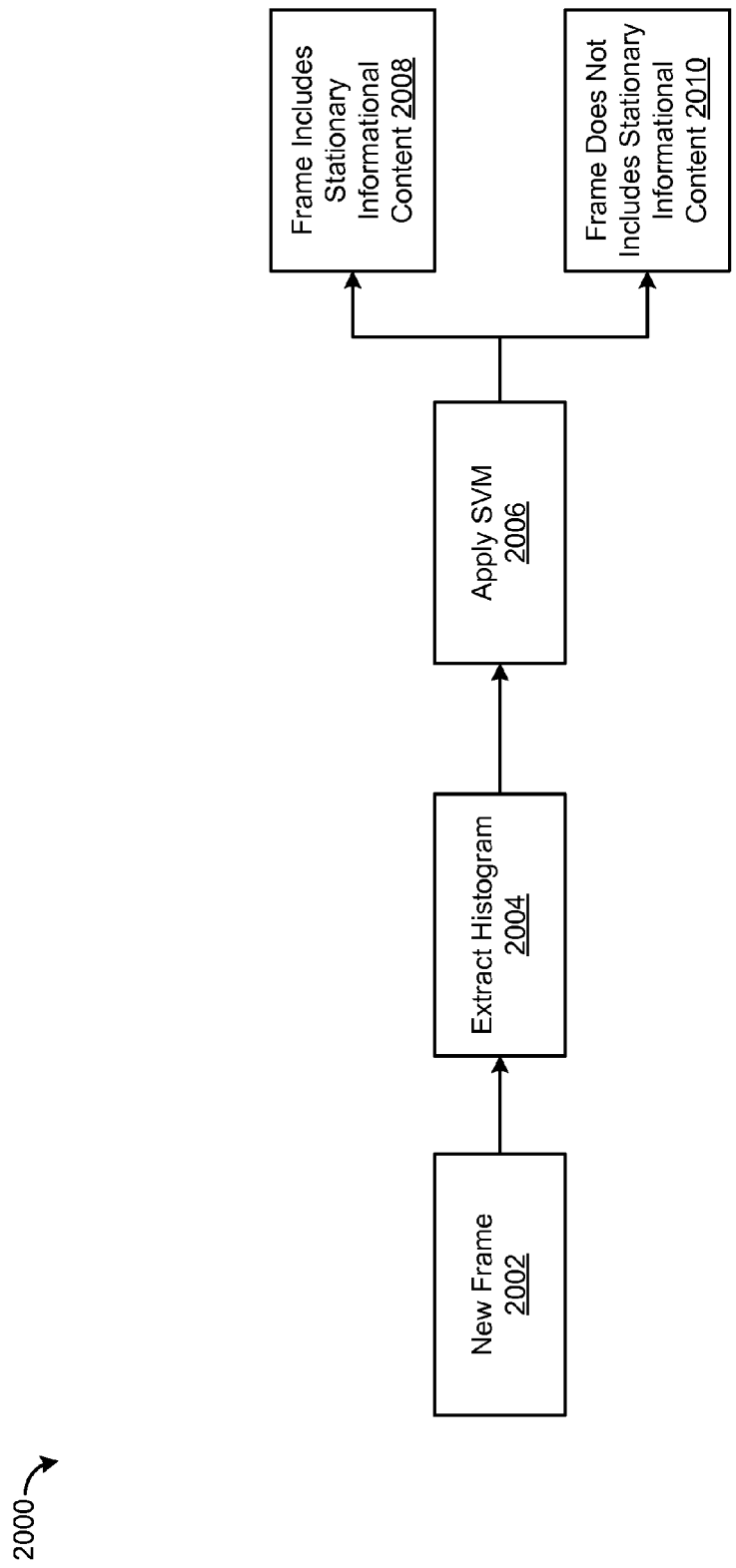
FIG. 20 is a block diagram of a process for using a support vector machine to identify frames including stationary informational content, according to some embodiments.

In embodiments in which the discriminative visual appearance model was generated, the server 110 uses the support vector machine to classify key frames as either key frames that include stationary informational content or key frames that include a face of a person without stationary informational content. FIG. 20 is a block diagram 2000 of a process for using a support vector machine to identify frames including stationary informational content, according to some embodiments. The server 110 receives a new frame 2002 and extracts a color histogram 2004 for the new frame 2002. The server 110 then applies the SVM 2006 to classify the new frame 2002 as either a frame that includes stationary informational content 2008 or a frame that does not include stationary informational content 2010.

In embodiments in which the generative visual appearance model was generated, the server 110 compares the template histogram to color histograms of the key frames in the set of key frames to identify key frames in the set of key frames that include stationary informational content or key frames that include a face of a person without stationary informational content.

The server 110 then removes (704) key frames that do not include stationary informational content and retains (706) key frames that include stationary informational content.

Finding Picture-in-Picture (Video-in-Video)

As discussed above with respect to FIG. 5B, some frames of a video may include picture-in-picture (video-in-video) regions. These frames may be missed when identifying consecutive frames that are stationary. In some embodiments, the visual appearance model is used to identify frames that include picture-in-picture (video-in-video) regions in which the regions are overlaid on top of stationary informational content. In these embodiments, candidate regions are identified by locating regions of the frames of localized motion and/or regions of the frames known to be commonly used for picture-in-picture (video-in-video) regions. In some embodiments, a search for a candidate region having predetermined dimensions is performed in the frames. For example, a search may be performed by iteratively searching for rectangular regions in the frames having a predetermined range of dimensions (e.g., 10 pixels by 20 pixels, 10 pixels by 25 pixels, 10 pixels by 30 pixels, 15 pixels by 20 pixels, etc.). In some embodiments, using a histogram back-projection technique (e.g., CAMshift), the visual appearance model is fit against the candidate region.

Figure 13:
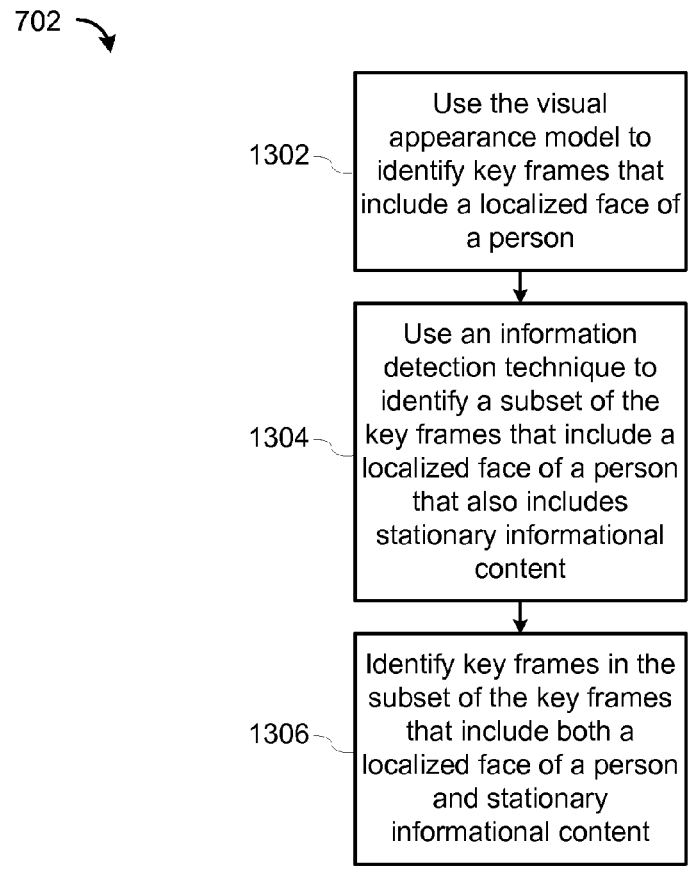
FIG. 13 is a flowchart of a method for using a visual appearance model to identify key frames that include stationary informational content when a frame includes a picture-in-picture region, according to some embodiments.

FIG. 13 is a flowchart of a method for using (702) the visual appearance model to identify key frames that include a localized face of a person when a frame includes a picture-in-picture (video-in-video) region, according to some embodiments. The server 110 uses (1302) the visual appearance model to identify key frames that include a localized face of a person. Next, the server 110 uses (1304) an information detection technique to identify a subset of the key frames that include a localized face of a person that also includes stationary informational content. The server 110 then identifies (1306) key frames in the subset of the key frames that include both a localized face of a person and stationary informational content.

Back-of-the-Room Frames

As discussed above with respect to FIG. 5D, some frames of a presentation video may include the room in which the presentation is being given (e.g., the video was shot from the back of the room). In these back-of-the-room frames, the stationary informational content and at least a portion of the room are visible in the frame. It is also common for such back-of-the-room frames to be mixed in the same video with a full-screen shot of stationary informational content as well as other camera shots that may not contain a good view of the slide. As discussed above, these frames may be missed if there the motion between consecutive frames exceeds the predetermined threshold. Thus, in some embodiments, the server 110 generates a room model based on a user-identified area of the frame in which stationary informational content is located. This user-specified area is then propagated to other frames that are back-of-the-room shots.

Figure 15:
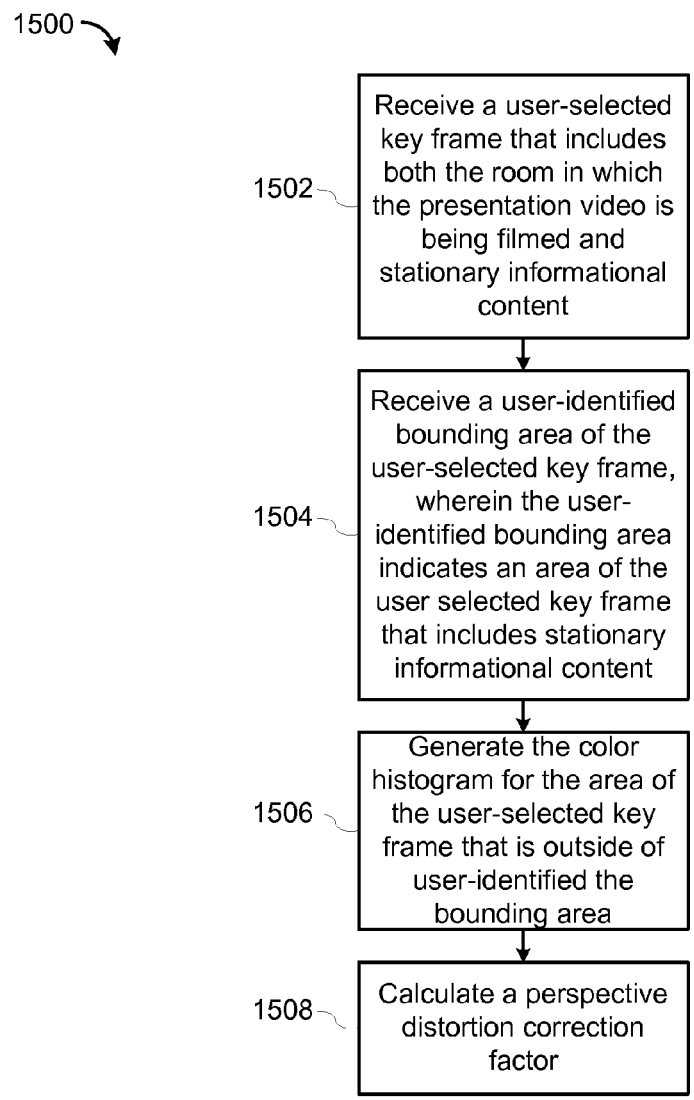
FIG. 15 is a flowchart of a method for generating a room model, according to some embodiments.
Figure 21A:
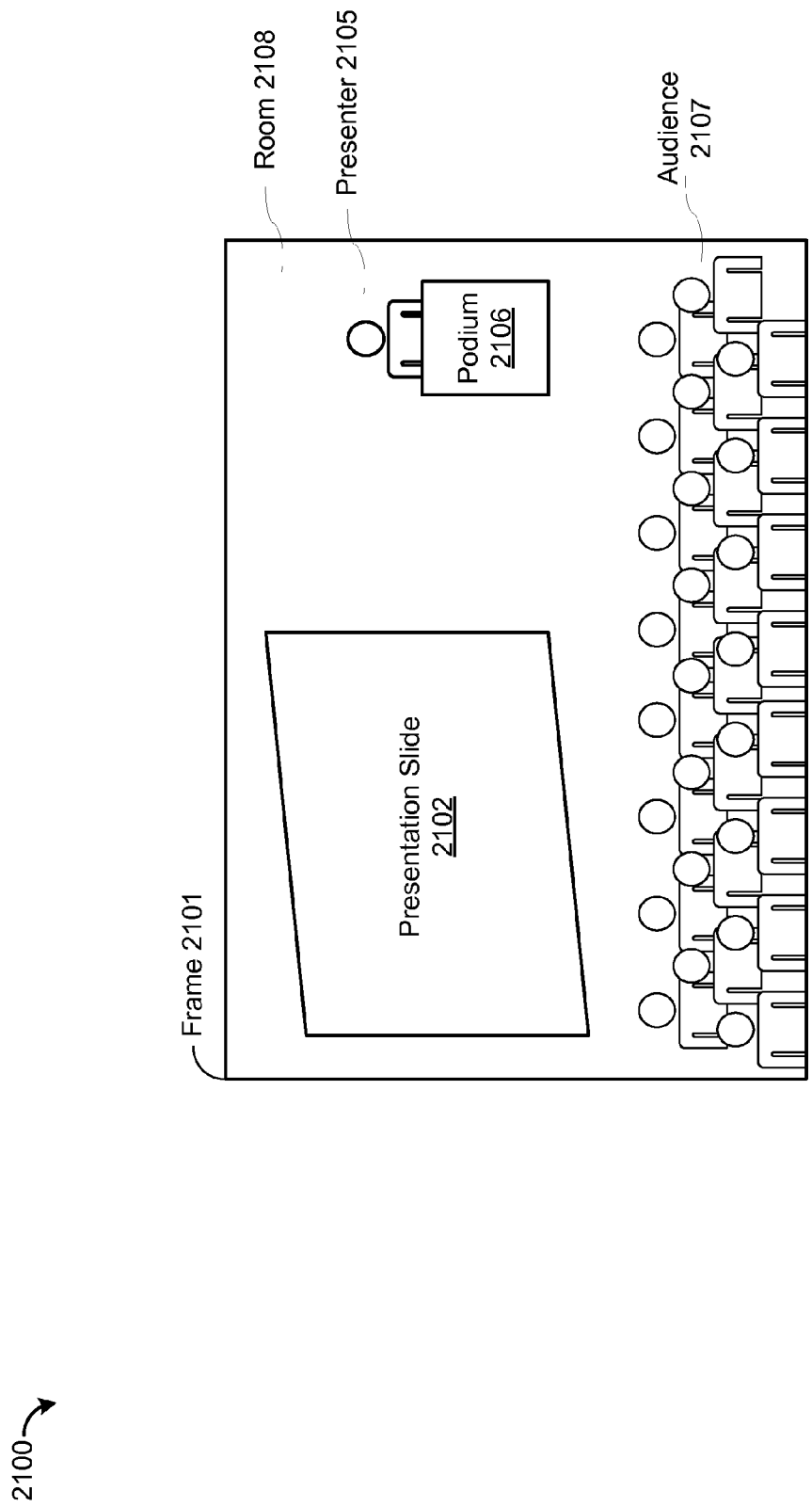
FIG. 21A is a block diagram illustrating a frame of a presentation video including a presentation slide displayed on a screen in a room, according to some embodiments.

FIG. 15 is a flowchart of a method 1500 for generating a room model, according to some embodiments. The server 110 receives (1502) a user-selected key frame that includes both the room in which the presentation video is being filmed and stationary informational content. For example, FIG. 21A is a block diagram 2100 illustrating a frame 2101 of a presentation video including a presentation slide 2102 displayed on a screen in a room 2108, according to some embodiments. As illustrated in FIG. 21A, the frame 2101 also includes a presenter 2105 and an audience 2107. Furthermore, the presentation slide 2102 may be in a perspective view, as illustrated in FIG. 21A.

Figure 21B:
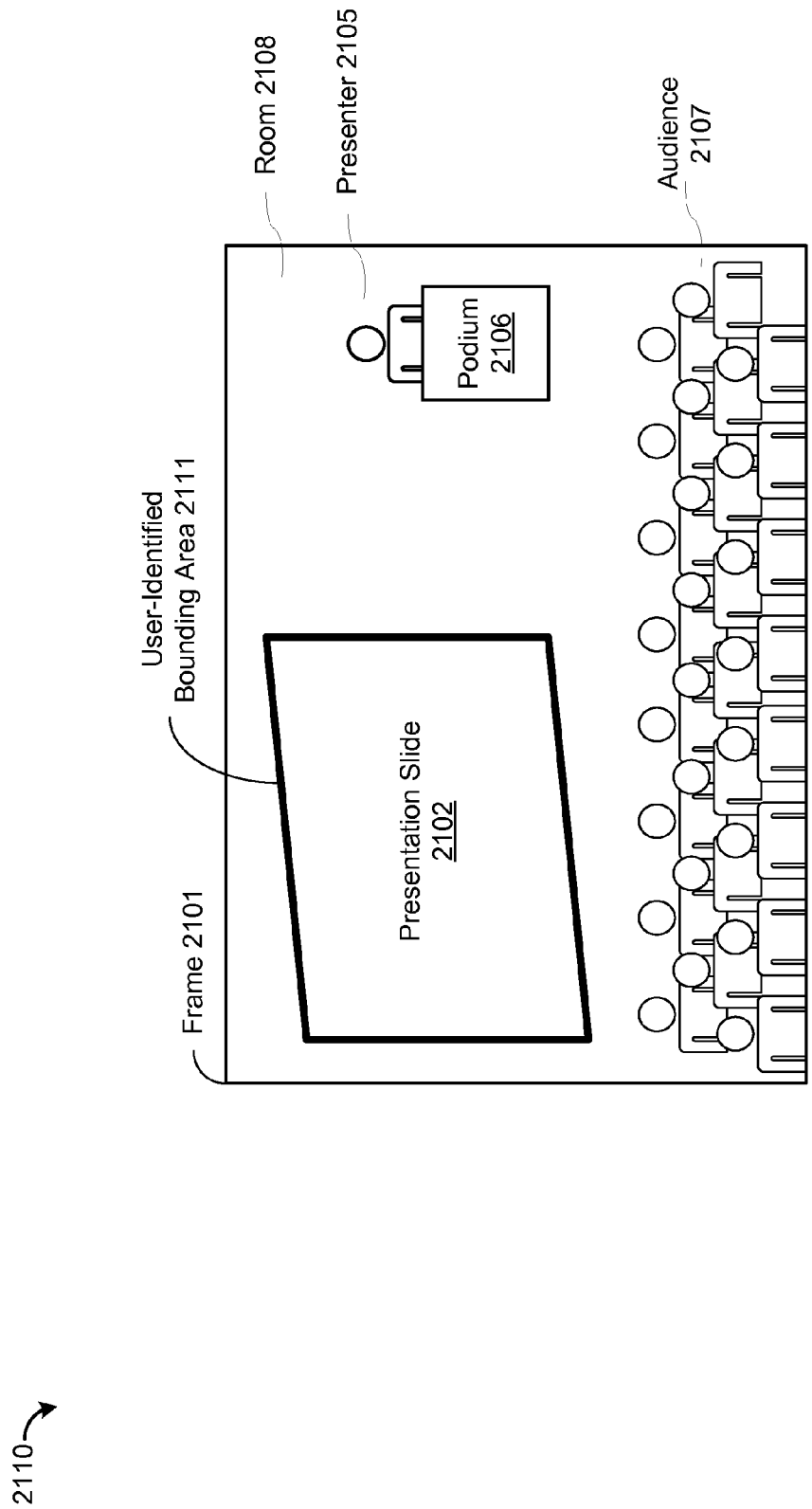
FIG. 21B is a block diagram illustrating a user-identified bounding area in the frame of the presentation video illustrated in FIG. 21A, according to some embodiments.

Next the server 110 receives (1504) a user-identified bounding area of the user-selected key frame, wherein the user-identified bounding area indicates an area of the user selected key frame that includes stationary informational content. For example, the user may click on the borders of the screen or board on which the stationary informational content is being displayed. FIG. 21B is a block diagram 2110 illustrating a user-identified bounding area 2111 in the frame 2101 of the presentation video illustrated in FIG. 21A, according to some embodiments.

The server 110 then generates (1506) the color histogram for the area of the user-identified key frame that is outside of the user-identified bounding area and calculates (1508) a perspective distortion correction factor.

In some embodiments, the room model is generated without user interaction. In these embodiments, a feature-based matching system may be used to match an instance of stationary informational content in a frame that is captured from the back-of-the-room with a frame containing the same stationary informational content captured full screen. By identifying corresponding points in the two frames including the same instance of stationary informational content and by identifying a perspective transform that maps the stationary informational content in the back-of-the room frame with stationary informational content of the full frame, the bounds of the stationary information content in the back-of-the-room frame can be identified without user input. In some embodiments, the features used to match the images scale invariant feature transform (SIFT) features. In some embodiments, each set of consecutive key frames are matched in this manner and a quality of match metric is used to determine whether the same instance of stationary informational content appears in both key frames.

Figure 23:
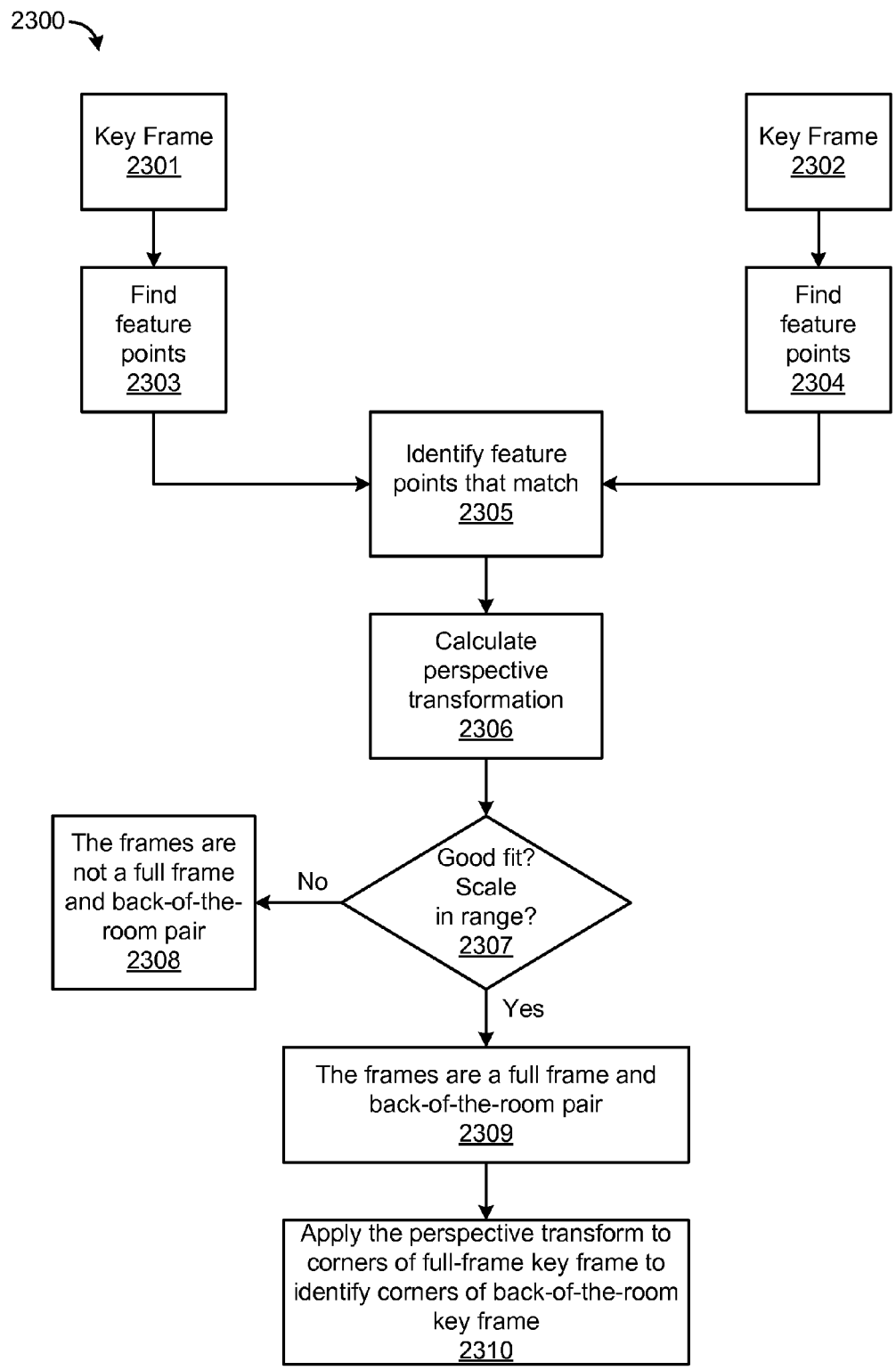
FIG. 23 is a block diagram illustrating an automated process for identifying stationary informational content in a back-of-room frame, according to some embodiments.

FIG. 23 is a block diagram illustrating an automated process 2300 for identifying stationary informational content in a back-of-room frame, according to some embodiments. This process may be used in lieu receiving the user-identified bounding area from a user in step 1504 of FIG. 15. The process 2300 begins when the server 110 finds (2303, 2304) feature points (e.g., SIFT feature points) for key frames 2301 and 2302, respectively. In some embodiments, the key frames 2301 and 2302 are consecutive key frames.

Figure 24A:
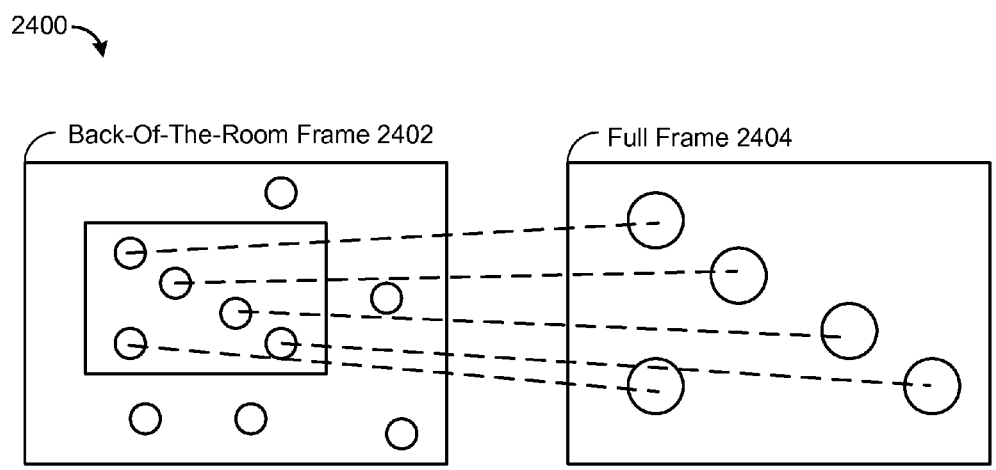
FIG. 24A is a block diagram illustrating matching feature points between a back-of-the-room frame and a full-frame, according to some embodiments.

Next, the server 110 identifies (2305) feature points that match between the key frames 2301 and 2302. For example, the server 110 may identify the features points that match by measuring the Euclidean distance between features points and keeping pairs of feature points with a distance less than a predetermined threshold. FIG. 24A is a block diagram 2400 illustrating matching feature points between a back-of-the-room frame 2402 and a full-frame 2404, according to some embodiments.

The server 110 then calculates (2306) a perspective transformation that best relates the matching feature points. For example, the server 110 may use an estimation technique such as the Random Sample Consensus (RANSAC) technique. In some embodiments, the resulting perspective transformation includes a translation factor, a scaling factor, and a perspective transformation factor that relate the matched feature points between the key frames 2301 and 2302.

Next, the server 110 determines (2307) whether the calculated perspective transformation has a good fit. For example, the server 110 determines whether the feature point coordinates in the key frame 2301 are mapped accurately by the perspective transformation to the corresponding matching feature point coordinates in the key frame 2302, and vice versa. The server 110 also determines whether the scaling factor is within a predefined range. Note that two substantially identical key frames will match with scale factor of 1.0. Also note that scaling factors that are extremely large or extremely small are not good candidates since the stationary informational content in the back-of-the-room frame would be very small. An example for a valid scaling factor range that scales the stationary informational content that is "smaller" (i.e., in back-of-the-room frame) to the stationary informational content that is larger (i.e., in the full-frame) is 0.5 to 0.9. In other words, the stationary informational content in the back-of-the-room frame is at least half as large as the stationary informational content in the full-frame but less than 90% of the size of the stationary informational content in the full-frame.

If the fit is not good or the scale is not in the predefined range (2307, no), the server 110 determines (2308) that the key frames 2301 and 2302 are not a full-frame and a back-of-the-room pair. In other words, the key frames 2301 and 2302 do not include the same stationary informational content or the key frames 2301 and 2302 do not have a scaling factor in the predefined range.

If the fit is good and the scale is in the predefined range (2307, yes), the server 110 determines (2309) that the key frames 2301 and 2302 are a full-frame and a back-of-the-room pair. The key frame that is larger (e.g., as determined from the scaling factor) is deemed to be the full-frame example and the key frame that is smaller (e.g., as determined from the scaling factor) is deemed to be the back-of-the-room example.

Figure 24B:
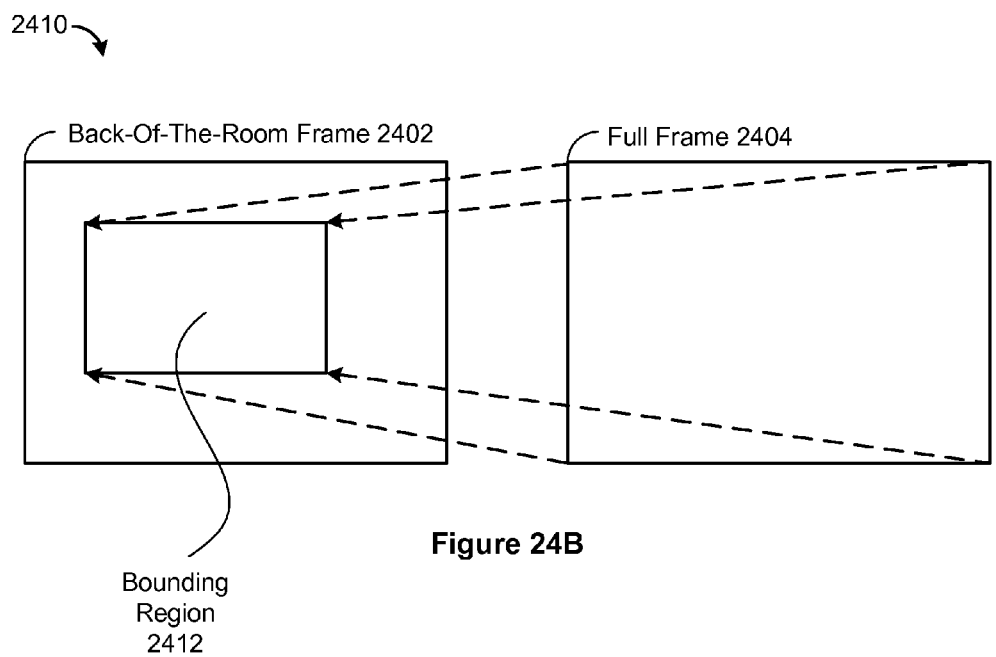
FIG. 24B is a block diagram illustrating identifying corners of a region including stationary informational in a back-of-the-room frame, according to some embodiments.

The server 110 then applies (2310) the perspective transformation to the coordinates of the corners of a polygon that defines a bounding region in the full-frame example including the stationary informational content in the full-frame example to identify the coordinates of the corners of a polygon that defines a bounding region in the back-of-the-room example including the stationary informational content in the back-of-the-room example. FIG. 24B is a block diagram illustrating 2410 identifying corners of a bounding region 2412 including stationary informational in the back-of-the-room frame 2402, according to some embodiments. Note that in the full-frame example, the corners of the bounding region are typically the corners of the key frame. The polygon that defines the bounding region in the back-of-the-room example is then used in lieu of the user-defined bounding region in FIG. 15.

Figure 14:
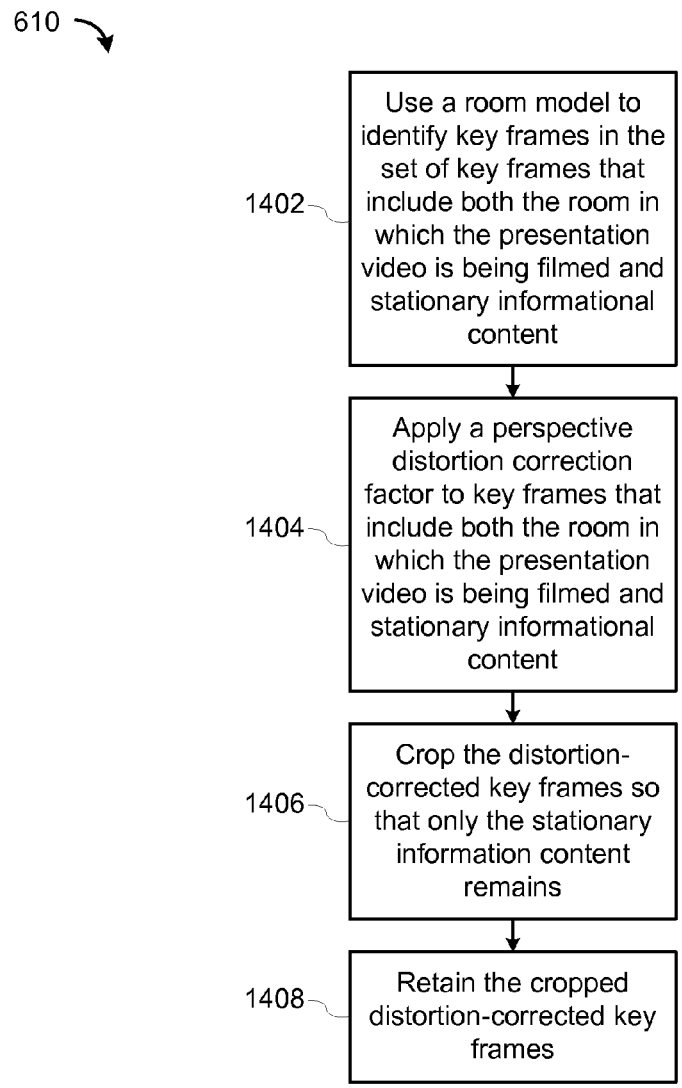
FIG. 14 is a flowchart of a method for retaining key frames that include stationary informational content when a frame includes a least a portion of a room in which the presenter is giving the presentation, according to some embodiments.
Figure 21C:
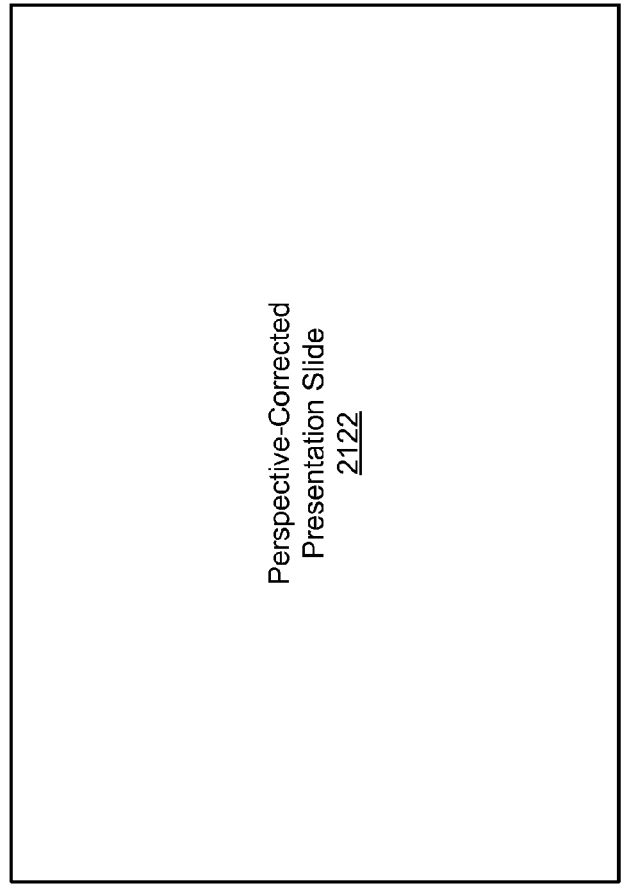
FIG. 21C is a block diagram illustrating a perspective-corrected presentation slide, according to some embodiments.
Figure 21C:
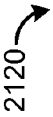

In some embodiments, after the room model is generated, the server 110 uses the room model to retain (610) the set of key frames that include stationary informational content when a frame includes a least a portion of a room in which the presenter is giving the presentation, as illustrated in FIG. 14. The server 110 uses (1402) a room model to identify key frames in the set of key frames that include both the room in which the presentation video is being filmed and stationary informational content. For example, the server 110 compares color histograms for the frames to the color histograms of the room model to identify frames that include stationary informational content while shot from the back of the room. In some embodiments, the server 110 uses the room model to identify key frames in the set of key frames that include both the room in which the presentation video is being filmed and stationary informational content by using the color histogram to identify key frames in the set of key frames that include both a room in which the presentation video is being filmed and stationary informational content Next, the server 110 then applies (1404) a perspective distortion correction factor to key frames that include both the room in which the presentation video is being filmed and stationary informational content. The server 110 crops (1406) the distortion-corrected key frames so that only the stationary information content remains. The server 110 then retains (1408) the cropped distortion-corrected key frames. For example, FIG. 21C is a block diagram 2120 illustrating a perspective-corrected presentation slide 2122 that was cropped from the frame 2101 of the video illustrated in FIG. 21A, according to some embodiments.

Built-Up Slides

Figure 22A:
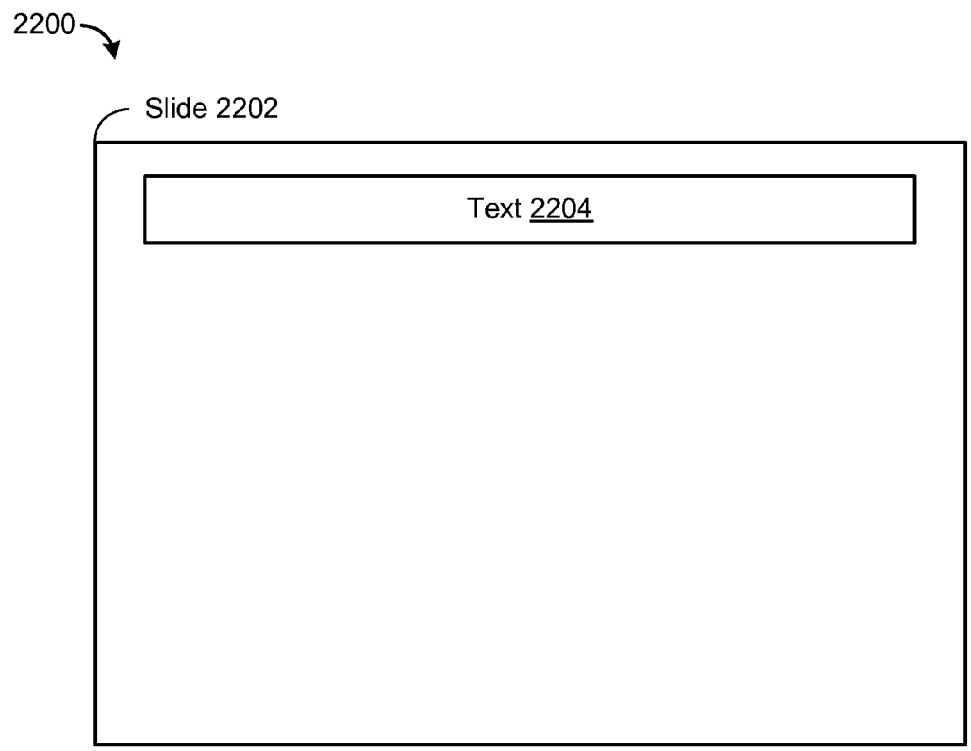
FIG. 22A is a block diagram illustrating a presentation slide that is built-up over time, according to some embodiments.
Figure 22B:
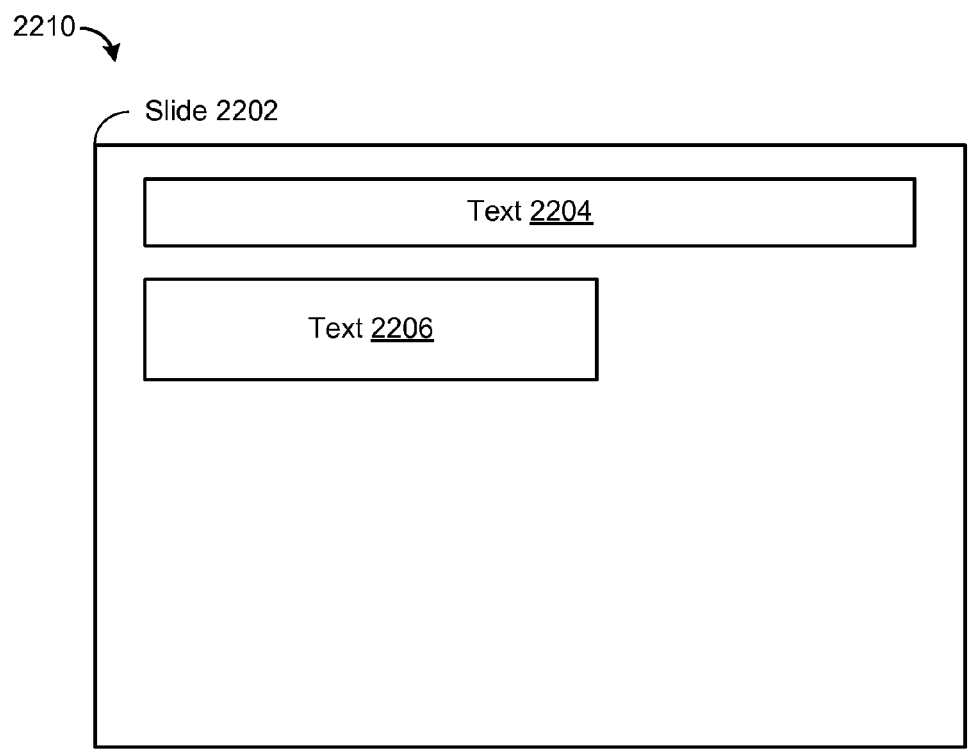
FIG. 22B is a block diagram illustrating a new element in the presentation slide, according to some embodiments.
Figure 22C:
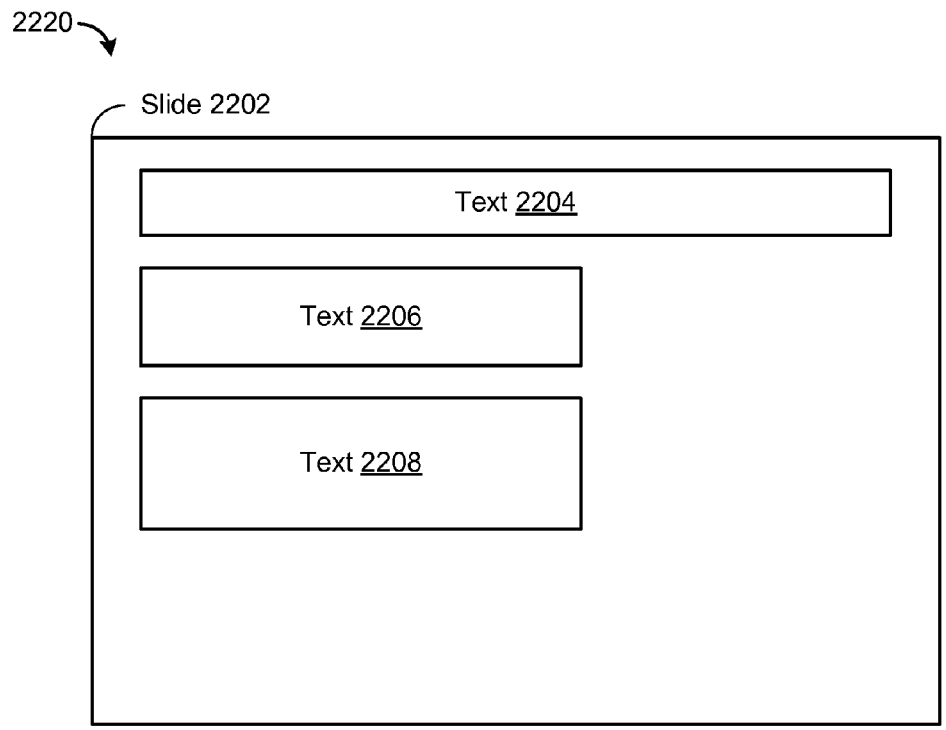
FIG. 22C is a block diagram illustrating another new element in the presentation slide, according to some embodiments.
Figure 22D:
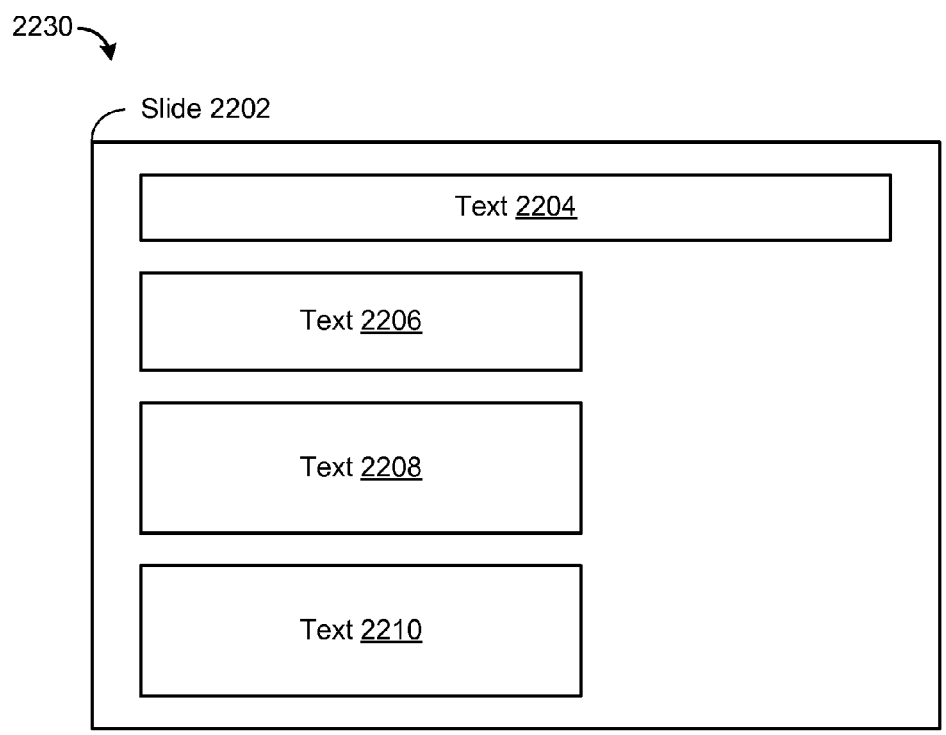
FIG. 22D is a block diagram illustrating another new element in the presentation slide, according to some embodiments.

During a presentation, a presenter may gradually add stationary informational content to previously-presented stationary informational content. For example, a presenter may use a built-up slide in which portions of a complete slide appear sequentially over time. Alternatively, a presenter may use a series of slides in which a new element is added to a previously presented slide. Similarly, a presenter may be adding content (e.g., handwritten content) to a blackboard or whiteboard as the presenter is speaking. Note that the discussion below refers to built-up slides, but may be applied to any content that is added to or built-up over time from previously-presented informational content. An exemplary built-up slide is presented in FIGS. 22A to 22D. FIG. 22A is a block diagram 2200 illustrating a presentation slide 2202 that is built-up over time, according to some embodiments. The presentation slide 2202 includes text 2204 at a time $t_1$. FIG. 22B is a block diagram 2210 illustrating a new element in the presentation slide, according to some embodiments. The presentation slide 2202 now includes text 2206 at a time $t_2$, where $t_2$ is later than $t_1$. FIG. 22C is a block diagram 2220 illustrating a new element in the presentation slide, according to some embodiments. The presentation slide 2202 now includes text 2208 at a time $t_3$, where $t_3$ is later than $t_2$. FIG. 22D is a block diagram 2230 illustrating a new element in the presentation slide, according to some embodiments. The presentation slide 2202 now includes text 2210 at a time $t_4$, where $t_4$ is later than $t_3$. As illustrated in FIGS. 22A to 22D, it is desirable to extract the key frame that is the key frame including the completed content (e.g., the content in FIG. 22D). In other words, the desired key frame is the key frame that provides the most visual information to the user.

Figure 16:
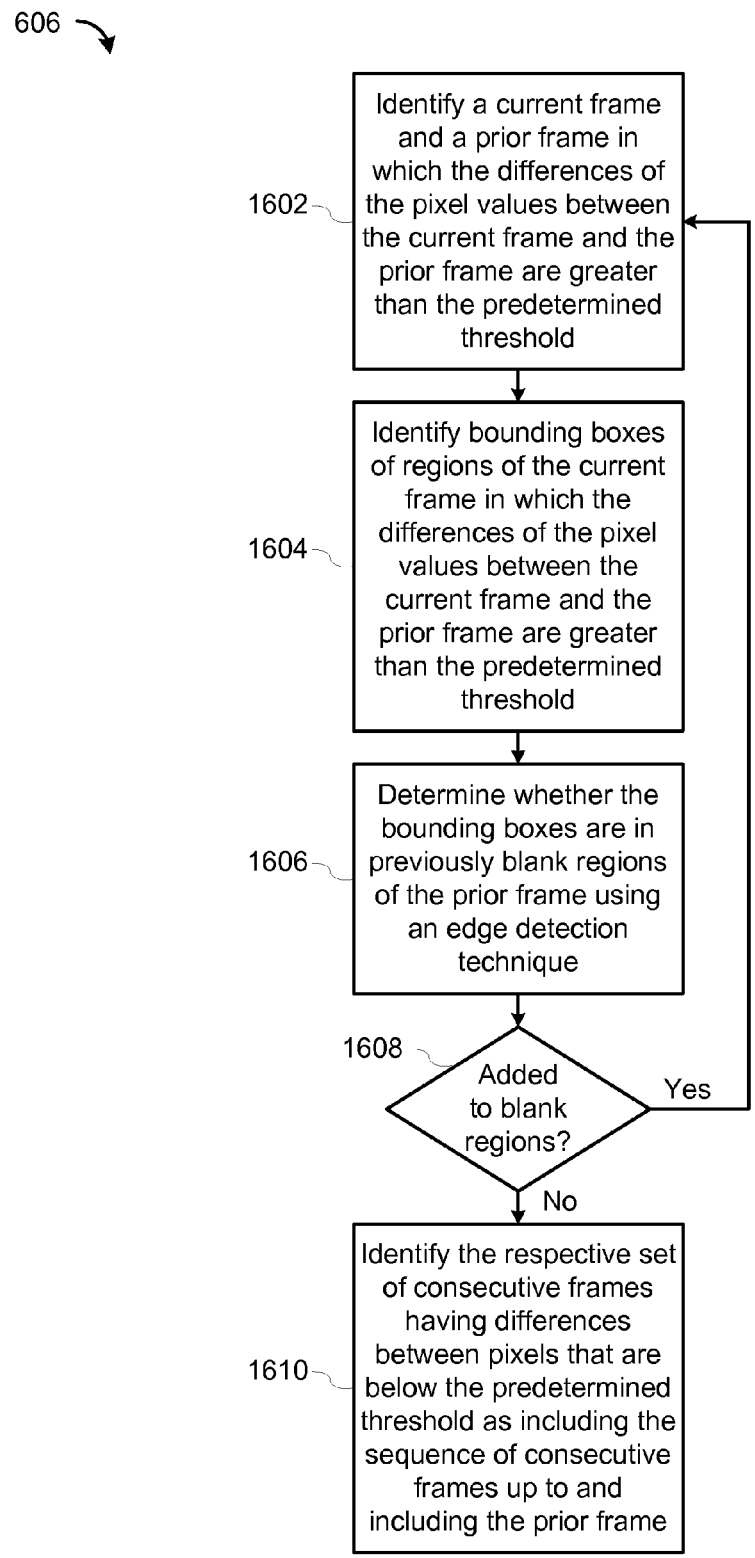
FIG. 16 is a flowchart of a method for identifying a set of consecutive frames that are stationary, according to some embodiments.

FIG. 16 is a flowchart of a method 1600 for identifying (606) a respective set of consecutive frames that are stationary (e.g., when the stationary informational content is built-up over time), according to some embodiments. The server 110 identifies (1602) a current frame and a prior frame in which the differences of the pixel values between the current frame and the prior frame are greater than the predetermined threshold. Next, the server 110 identifies (1604) bounding boxes of regions of the current frame in which the differences of the pixel values between the current frame and the prior frame are greater than the predetermined threshold. In some embodiments, the server 110 tests the spatial extent of the regions of the current and prior frames in which a difference of pixel values is detected to determine whether the regions are localized. In some embodiments, the regions are localized if the regions are within a portion of the frames likely to include text or other stationary informational content.

The server 110 then determines (1606) whether the bounding boxes are in previously blank regions of the prior frame using an edge detection technique. If the bounding boxes are in previously blank regions of the prior frame (1608, yes), the server 110 repeats the identifying, testing, and determining operations until the differences of the pixel values between the current frame and the prior frame exceeds the predefined threshold in regions of the prior frame that were not blank (i.e., the server 110 returns to step 1602). In other words, the current frame includes a new element was added to a previously-blank region of the previously-presented slide (i.e., the slide is still being built-up). If the bounding boxes are not in previously blank regions of the prior frame (1608, no), the server 110 identifies (1610) the respective set of consecutive frames that are stationary as including the sequence of consecutive frames up to and including the prior frame. In other words, the current frame includes a new slide (or new stationary informational content) and the last frame in the set of consecutive frames is selected to be the frame prior to the frame including the new slide (or new stationary informational content). In some embodiments, the prior frame (i.e., the last frame in the respective set of consecutive frames) is used as the key frame that includes the complete stationary informational content for the built-up slide.

In some embodiments, the server 110 provides links into the presentation video at time points corresponding to frames of the respective set of consecutive frames in which the bounding boxes of regions of the frames have differences of the pixel values between consecutive frames that are greater than the predetermined threshold and that have been added to previously blank regions of prior frames. In other words, for each bounding box identified (i.e., corresponding to new stationary informational content in the built-up slide), the server 110 provides links into the presentation video in the last frame of the respective set of consecutive frames (i.e., the extracted key frame) so that when a user clicks on a respective link of a respective bounding box, the browser 122 (or the application 124) requests and starts the presentation video at the time corresponding to the time at which the respective bounding box first appears in the presentation video. For example, the user may be presented with the final fully built-up slide that includes links that link back to the time at which the respective portion of the slide first appeared. That is, for a slide with several bullet points that appeared in sequence over time, the key frame shows all of the bullet points. Clicking a link in the key frame for a first bullet point plays the presentation video from the point when the first bullet appeared in the presentation video, clicking a link in the key frame for a second bullet point plays the presentation video from the point when the second bullet point appeared in the presentation video, and so on.

Integrating Appearance Modeling

In some embodiments, the visual appearance model, spatial cues, an informational content detection technique, and a face detection technique are used in combination to identify key frames that include stationary informational content. These embodiments are similar to the processes described above except that the server 110 first applies a spatial blur to the frames. After computing the difference between pixel values of the frames, the server 110 calculates bounding boxes that include the regions that have differences in pixel values that that exceed a predetermined threshold. If these bounding boxes are larger in area than a predetermined threshold and are located primarily in the center of the frame, the server 110 deems the frame to begin a potential segment that should be considered for key frame extraction. The server 110 then applies an informational content detection technique (e.g., OCR) to the final frame in a segment that contains stationary informational content (e.g., informational content that is stationary for a predetermined time period). If stationary informational content is not detected in the frames, the frames are passed to the visual appearance model (e.g., the SVM) to determine whether the frames match the visual appearance model. If the frames match the visual appearance model, the server 110 removes the frames from the key frame list.

The techniques described herein are not restricted to identifying frames including text. Any stationary informational content (e.g., text, symbols, line drawings, pictures, etc.) may be detected using these techniques. For example, the techniques described above may be used to identify frames including mathematical symbols and/or line drawings. Furthermore, the techniques described herein may be used to identify frames that include stationary informational content on any media. For example, the media may include a screen on which a slide is projected, a screen on which a transparency is projected, a blackboard, a whiteboard, and the like. Moreover, the stationary content may include stationary informational content that includes computer-generated and/or handwritten text (in any language), line drawings, pictures, and the like.

In some embodiments, a search engine performs the techniques described herein. In these embodiments, the search engine indexes presentation videos (e.g., as described herein) and provides a search interface for performing searches against the index. The search interface may be a general web search interface that is used to perform searches for web documents. The search interface may also be a search interface that is separate and distinct from a general web search interface (e.g., a video search interface). When a user submits search terms through the search interface, the search engine searches the index for key frames that include stationary informational content relevant to the search terms. The search engine then presents the search results to the user. The search results may be presented by displaying key frames that include links to the corresponding videos that are relevant to the search terms. When a user clicks on a displayed key frame, the corresponding video is retrieved by the user's computer system and played starting at the time index corresponding to the key frame.

The methods discussed with respect to FIGS. 6-18 may be governed by instructions that are stored in a computer readable storage medium and that are executed by one or more processors of one or more servers. Each of the operations shown in FIGS. 6-18 may correspond to instructions stored in a computer memory or computer readable storage medium. The computer readable storage medium may include a magnetic or optical disk storage device, solid state storage devices such as Flash memory, or other non-volatile memory device or devices. The computer readable instructions stored on the computer readable storage medium are in source code, assembly language code, object code, or other instruction format that is interpreted and/or executable by one or more processors.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method for identifying key frames of a presentation video that include stationary informational content, comprising:
   at a computer system including one or more processors and memory storing one or more programs, the one or more processors executing the one or more programs to perform the operations of:
      obtaining a sequence of frames from a presentation video;
      computing differences of pixel values between consecutive frames of the sequence of frames;
      identifying sets of consecutive frames that are stationary, wherein consecutive frames that are stationary have a proportion of changed pixel values below a first predetermined threshold, and wherein pixel values are deemed to be changed when the difference between the pixel values for corresponding pixels in consecutive frames exceeds a second predetermined threshold;
      extracting key frames from the sets of consecutive frames;
      retaining a set of key frames that include stationary informational content; and
      displaying the set of key frames that include stationary informational content for user interaction.

2. The method of claim 1, wherein the presentation video is an archived presentation video.

3. The method of claim 2, wherein the archived presentation video is located on a second computer system that is separate and distinct from the computer system.

4. The method of claim 1, wherein only connected regions of changed pixel larger than a predetermined size are considered when determining if consecutive frames are stationary.

5. The method of claim 1, wherein the presentation video is a real-time presentation video.

6. The method of claim 1, wherein the stationary informational content includes one or more of:
   text;
   symbols;
   line drawings; and
   pictures.

7. The method of claim 6, wherein the stationary informational content is included in one or more presentation slides.

8. The method of claim 1, wherein obtaining a sequence of frames from the presentation video includes:
   retrieving the presentation video; and
   obtaining frames of the presentation video at a predetermined time interval to produce the sequence of frames.

9. The method of claim 1, wherein a respective set of consecutive frames includes a predetermined number of consecutive frames having a proportion of changed pixel values below a first predetermined threshold, and wherein pixel values are deemed to be changed when the difference between the pixel values for corresponding pixels in consecutive frames exceeds a second predetermined threshold.

10. The method of claim 1, wherein extracting a respective key frame from a respective set of consecutive frames includes selecting a predetermined frame from the respective set of consecutive frames.

11. The method of claim 1, wherein retaining the set of key frames that include stationary informational content includes:
   using a visual appearance model to identify key frames in the set of key frames that include stationary informational content;
   removing key frames that do not include stationary informational content; and
   retaining key frames that include stationary informational content.

12. The method of claim 11, wherein at least one frame in the sequence of frames includes a face of a person without stationary informational content.

13. The method of claim 12, wherein prior to using the visual appearance model to identify key frames in the set of key frames that include stationary informational content, the method further comprises generating the visual appearance model by:
   identifying a first set of frames in the sequence of frames that do not include stationary informational content;
   identifying a second set of frames in the sequence of frames that include stationary informational content; and
   training a support vector machine to identify frames that include stationary informational content using the first set of frames and the second set of frames.

14. The method of claim 13, wherein identifying the first set of frames in the sequence of frames that do not include stationary informational content includes:

selecting a third set of frames in the sequence of frames that includes consecutive frames that are not stationary, wherein consecutive frames that are not stationary have differences of pixel values between consecutive frames that are above the predetermined threshold;

identifying a fourth set of frames in the third set of frames that include faces using a face detection technique;

identifying a fifth set of frames in the third set of frames that do not include stationary informational content using an informational content detection technique;

identifying the first set of frames as frames that are included in both the fourth set of frames and the fifth set of frames.

15. The method of claim 14, wherein the informational content detection technique is an optical character recognition technique that detects text.

16. The method of claim 13, wherein identifying the second set of frames in the sequence of frames that include stationary informational content includes:

selecting a sixth set of frames in the sequence of frames that includes consecutive frames that are stationary;

identifying a seventh set of frames in the sequence of frames that include stationary informational content using an informational content detection technique;

identifying the second set of frames as the frames that are included in both the sixth set of frames and the seventh set of frames.

17. The method of claim 13, wherein training the support vector machine to identify frames that include stationary informational content using the first set of frames and the second set of frames includes:

computing color histograms for the first set of frames and the second set of frames; and training the support vector machine to identify frames that include stationary informational content using the color histograms for the first set of frames and the second set of frames.

18. The method of claim 13, wherein using the visual appearance model to identify key frames in the set of key frames that include stationary informational content includes using the support vector machine to classify key frames as either key frames that include stationary informational content or key frames that include a face of a person without stationary informational content.

19. The method of claim 12, wherein prior to using the visual appearance model to identify key frames in the set of key frames that include stationary informational content, the method further comprises generating the visual appearance model by:

identifying frames in the first set of frames that include faces using a face detection technique;

determining color histograms for the frames in the first set of frames that include faces; and generating a template histogram based on the color histograms for the frames in the first set of frames that include faces.

20. The method of claim 19, wherein using the visual appearance model to identify key frames in the set of key frames that include stationary informational content includes comparing the template histogram to color histograms of the key frames in the set of key frames to identify key frames in the set of key frames that include stationary informational content or key frames that include a face of a person without stationary informational content.

21. The method of claim 11, wherein at least one key frame in the set of key frames includes both a localized face of a person and stationary informational content, and wherein using the visual appearance model to identify key frames in the set of key frames that include stationary informational content includes:

using the visual appearance model to identify key frames that include a localized face of a person;

using an information detection technique to identify a subset of the key frames that include a localized face of a person that also includes stationary informational content; and identifying key frames in the subset of the key frames that include both a localized face of a person and stationary informational content.

22. The method of claim 1, wherein at least one key frame in the set of key frames includes both a room in which the presentation video is being filmed and stationary informational content, and wherein retaining the set of key frames that include stationary informational content includes:

using a room model to identify key frames in the set of key frames that include both the room in which the presentation video is being filmed and stationary informational content;

applying a perspective distortion correction factor to key frames that include both the room in which the presentation video is being filmed and stationary informational content;

cropping the distortion-corrected key frames so that only the stationary information content remains; and retaining the cropped distortion-corrected key frames.

23. The method of claim 22, wherein prior to using the room model to identify key frames in the set of key frames that include both the room in which the presentation video is being filmed and stationary informational content, the method further comprises generating the room model by:

receiving a user-selected key frame that includes both the room in which the presentation video is being filmed and stationary informational content;

receiving a user-identified bounding area of the user-selected key frame, wherein the user-identified bounding area indicates an area of the user-selected key frame that includes stationary informational content;

generating the color histogram for the area of the user-selected key frame that is outside of the user-identified bounding area; and calculating a perspective distortion correction factor.

24. The method of claim 23, wherein using the room model to identify key frames in the set of key frames that include both the room in which the presentation video is being filmed and stationary informational content includes using the color histogram to identify key frames in the set of key frames that include both a room in which the presentation video is being filmed and stationary informational content.

25. The method of claim 1, wherein at least one sequence of consecutive frames comprise informational content that is built up over a number of frames, and wherein identifying a respective set of consecutive frames that are stationary includes:

identifying a current frame and a prior frame in which the differences of the pixel values between the current frame and the prior frame are greater than the predetermined threshold;

identifying bounding boxes of regions of the current frame in which the differences of the pixel values between the current frame and the prior frame are greater than the predetermined threshold;

determining whether the bounding boxes are in previously blank regions of the prior frame using an edge detection technique;

if the bounding boxes are in previously blank regions of the prior frame, repeating the identifying, testing, and determining operations until the differences of the pixel values between the current frame and the prior frame exceeds the predefined threshold in regions of the prior frame that were not blank;

identifying the respective set of consecutive frames that are stationary as including the sequence of consecutive frames up to and including the prior frame.

26. The method of claim 25, further comprising providing links into the presentation video at time points corresponding to frames of the respective set of consecutive frames in which the bounding boxes of regions of the frames have differences of the pixel values between consecutive frames that are greater than the predetermined threshold and that have been added to previously blank regions of prior frames.

27. The method of claim 25, wherein the at least one sequence of consecutive frames comprise informational content that is built up over a number of frames is a presentation slide that includes elements that are built up over a period of time.

28. The method of claim 25, wherein the at least one sequence of consecutive frames comprise informational content that is built up over a number of frames is a handwritten presentation that includes information content that is built up over a period of time.

29. The method of claim 1, further comprising:
using an optical character recognition technique to extract text from the set of key frames; and
indexing the extracted text.

30. The method of claim 29, further comprising providing a search interface for user interaction, wherein the search interface allows users to perform searches based on keywords to identify presentation videos including the keywords.

31. The method of claim 1, further comprising providing links into the presentation video at time points corresponding to respective key frames in the displayed set of key frames.

32. A system for identifying key frames of a presentation video that include stationary informational content, comprising:
one or more processors;
memory; and
one or more programs stored in the memory, the one or more programs comprising instructions to:
obtain a sequence of frames from a presentation video;
compute differences of pixel values between consecutive frames of the sequence of frames;
identify sets of consecutive frames that are stationary, wherein consecutive frames that are stationary have a proportion of changed pixel values below a first predetermined threshold, and wherein pixel values are deemed to be changed when the difference between the pixel values for corresponding pixels in consecutive frames exceeds a second predetermined threshold;
extract key frames from the sets of consecutive frames;
retain a set of key frames that include stationary informational content; and
display the set of key frames that include stationary informational content for user interaction.

33. A computer readable storage medium storing one or more programs configured for execution by a computer, the one or more programs comprising instructions to:
at a computer system including one or more processors and memory storing one or more programs,
obtain a sequence of frames from a presentation video;
compute differences of pixel values between consecutive frames of the sequence of frames;
identify sets of consecutive frames that are stationary, wherein consecutive frames that are stationary have a proportion of changed pixel values below a first predetermined threshold, and wherein pixel values are deemed to be changed when the difference between the pixel values for corresponding pixels in consecutive frames exceeds a second predetermined threshold;
extract key frames from the sets of consecutive frames;
retain a set of key frames that include stationary informational content; and
display the set of key frames that include stationary informational content for user interaction.

* * * * *